United States Patent
Kwon et al.

(10) Patent No.: US 11,425,646 B2
(45) Date of Patent: Aug. 23, 2022

(54) SIGNAL TRANSMISSION METHOD AND DEVICE OF TERMINAL IN WIRELESS MOBILE COMMUNICATION SYSTEM

(71) Applicant: Samsung Electronics Co., Ltd., Suwon-si (KR)

(72) Inventors: Sangwook Kwon, Suwon-si (KR); Hyunjeong Kang, Seoul (KR); Youngjoong Mok, Suwon-si (KR); June Hwang, Incheon (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 16/347,186

(22) PCT Filed: Nov. 3, 2017

(86) PCT No.: PCT/KR2017/012417
§ 371 (c)(1),
(2) Date: May 2, 2019

(87) PCT Pub. No.: WO2018/084638
PCT Pub. Date: May 11, 2018

(65) Prior Publication Data
US 2019/0364501 A1 Nov. 28, 2019

(30) Foreign Application Priority Data

Nov. 3, 2016 (KR) .................. 10-2016-0146077
Jan. 3, 2017 (KR) .................. 10-2017-0000908
Aug. 10, 2017 (KR) .................. 10-2017-0101918

(51) Int. Cl.
*H04W 52/02* (2009.01)
*H04W 72/04* (2009.01)
*H04L 5/00* (2006.01)

(52) U.S. Cl.
CPC ....... *H04W 52/0216* (2013.01); *H04L 5/0037* (2013.01); *H04W 72/048* (2013.01); *H04W 72/0446* (2013.01)

(58) Field of Classification Search
None
See application file for complete search history.

(56) References Cited

U.S. PATENT DOCUMENTS

2013/0210460 A1 8/2013 Subramanian et al.
2016/0295624 A1* 10/2016 Novlan ............... H04W 72/04
(Continued)

FOREIGN PATENT DOCUMENTS

WO 2015/163481 A1 10/2015
WO 2016085210 A1 6/2016

OTHER PUBLICATIONS

3GPP TSG-RAN WG2 Meeting #95bis, Oct. 10-14, 2016—Considerations on pre-sensing on exceptional resource pool (Year: 2016).*

(Continued)

*Primary Examiner* — Peter Chen
*Assistant Examiner* — Jeff Banthrongsack

(57) ABSTRACT

The present disclosure relates to a communication technique for converging IoT technology with a 5G communication system for supporting a higher data transmission rate beyond a 4G system, and a system therefor. The present disclosure may be applied to an intelligent service (for example, a smart home, a smart building, a smart city, a smart car or connected car, health care, digital education, retail business, a security and safety-related service, etc.) on the basis of 5G communication technology and IoT-related technology. In addition, a method of a terminal, based on the present invention, comprises the steps of: receiving information associated with the sharing of a scheduling resource and a sensing resource; receiving modified resource information (Continued)

based on the connection or disconnection of a terminal that does not support resource sharing; and transmitting/receiving data based on the modified resource information.

20 Claims, 34 Drawing Sheets

(56) References Cited

U.S. PATENT DOCUMENTS

2017/0006596 A1* 1/2017 Adachi .............. H04W 72/048
2017/0280469 A1 9/2017 Park et al.
2018/0092065 A1* 3/2018 Sheng .................. H04W 72/02

OTHER PUBLICATIONS

ISA/KR, "International Search Report and Written Opinion of the International Search Authority," International Application No. PCT/KR2017/012417, dated Jan. 31, 2018, 9 pages.
NTT DOCOMO, "Discussion on Resource Pool for PC5 based V2V Communications," R1-165195, 3GPP TSG RAN WG1 Meeting #85, Nanjing, China, May 23-27, 2016, 4 pages.
Samsung, "V2X corrections regarding Tx resource selection and pool usage," R2-166657, 3GPP TSG-RAN2 Meeting #95bis, Kaohsiung, Taiwan, Oct. 10-14, 2016, 9 pages.
ZTE Corporation, "Clarification on the usage of exceptional pool," R2-166554, 3GPP TSG-RAN Meeting #95bis, Kaohsiung, Taiwan, Oct. 10-14, 2016, 5 pages.
ZTE, "Considerations on pre-sensing on exceptional resource pool," R2-166860, 3GPP TSG-RAN WG2 Meeting #95bis, Kaohsiung, Taiwan, Oct. 10-14, 2016, 4 pages.
NTT DOCOMO, Inc., "Evaluation and discussion on resource selection for pedestrian UEs", 3GPP TSG RAN WG1 Meeting #86, Aug. 22-26, 2016, R1-167886, 6 pages.
Supplementary European Search Report dated Aug. 20, 2019 in connection with European Patent Application No. 17 86 8256, 10 pages.
European Patent Office, "European Search Report" dated Feb. 9, 2022, in connection with European Patent Application No. 21208615.1, 9 pages.
Samsung, "Remaining issues related to Tx resource selection and pool usage" 3GPP TSG-RAN WG2 Meeting #95 bis, R2-166658, Kaohsiung, Taiwan, Oct. 10-14, 2016, 5 pages.

* cited by examiner

FIG. 4

| Remaining power | Sensing period |
|---|---|
| Full | 100ms |
| 90% | 90ms |
| 80% | 80ms |
| ... | ... |
| 10% | 10ms |

FIG. 9
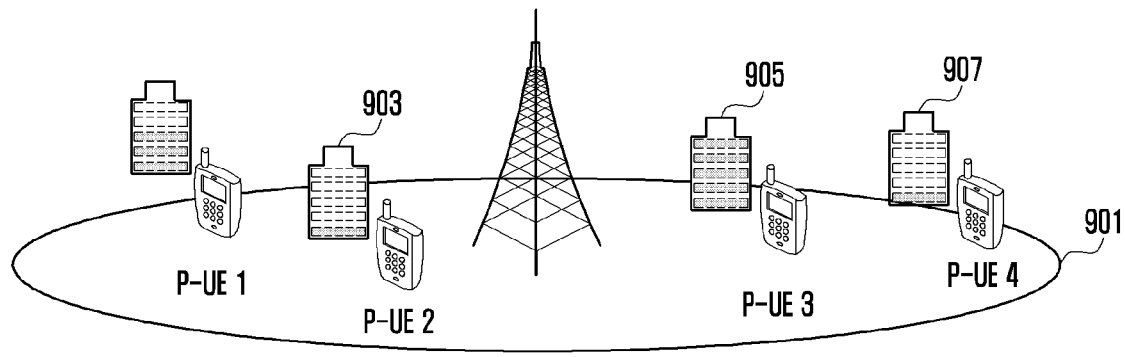
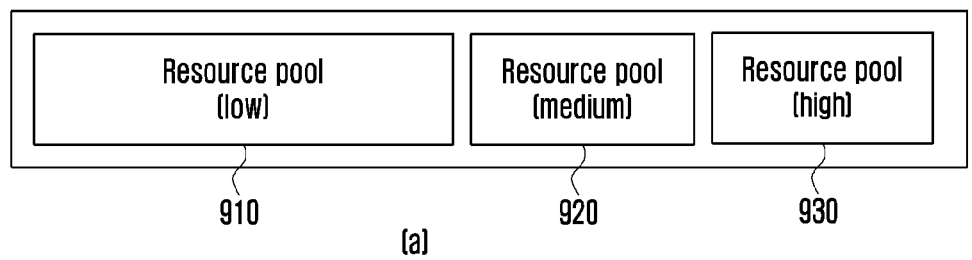
(a)
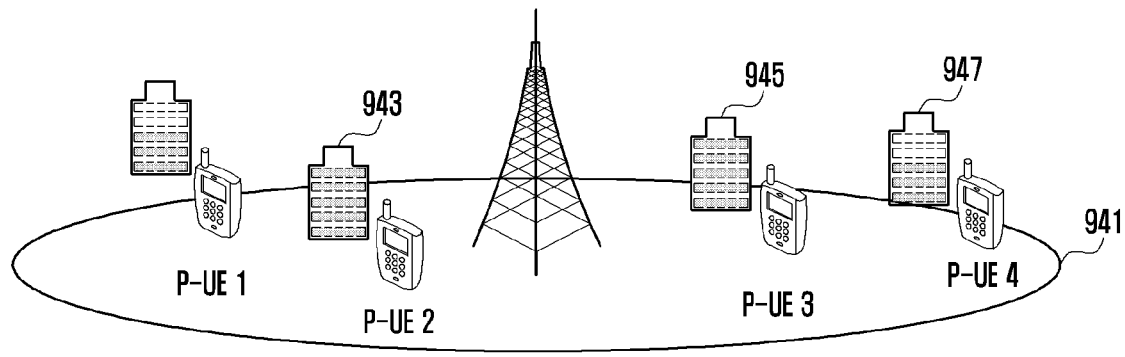
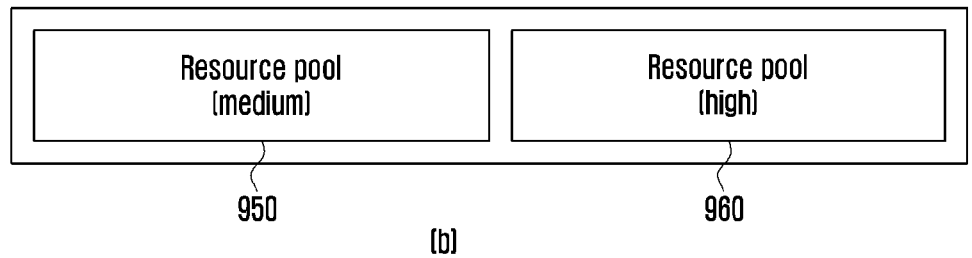
(b)

FIG. 16
| RX power \ RX capability | X | O |
|---|---|---|
| low | 4 | 2 |
| medium | 5 | 5 |
| high | 3 | 7 |
S1610
# of random selection candidates
S1620
# of partial sensing candidates FIG. 22
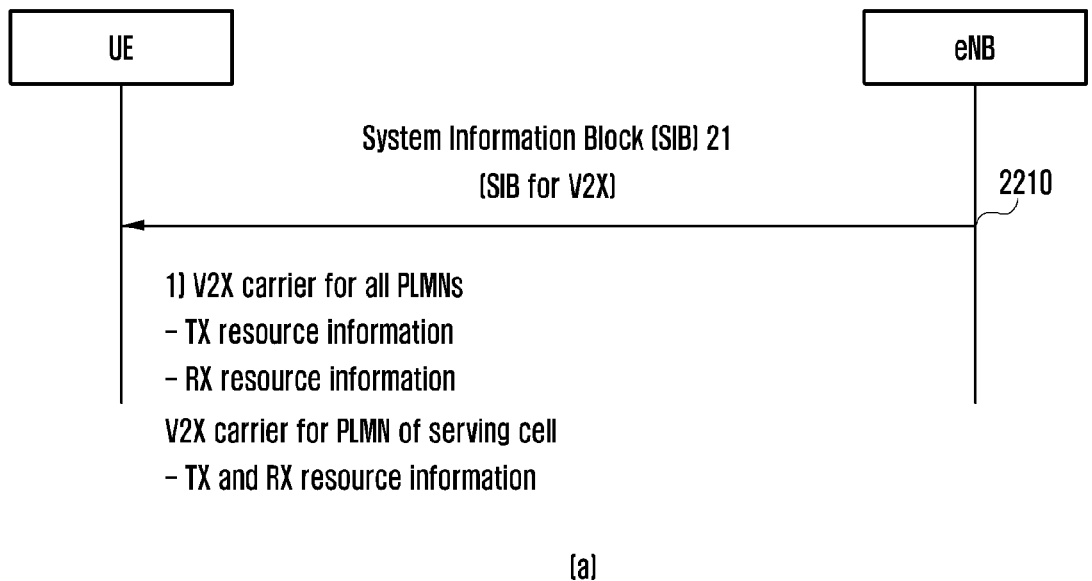
(a)
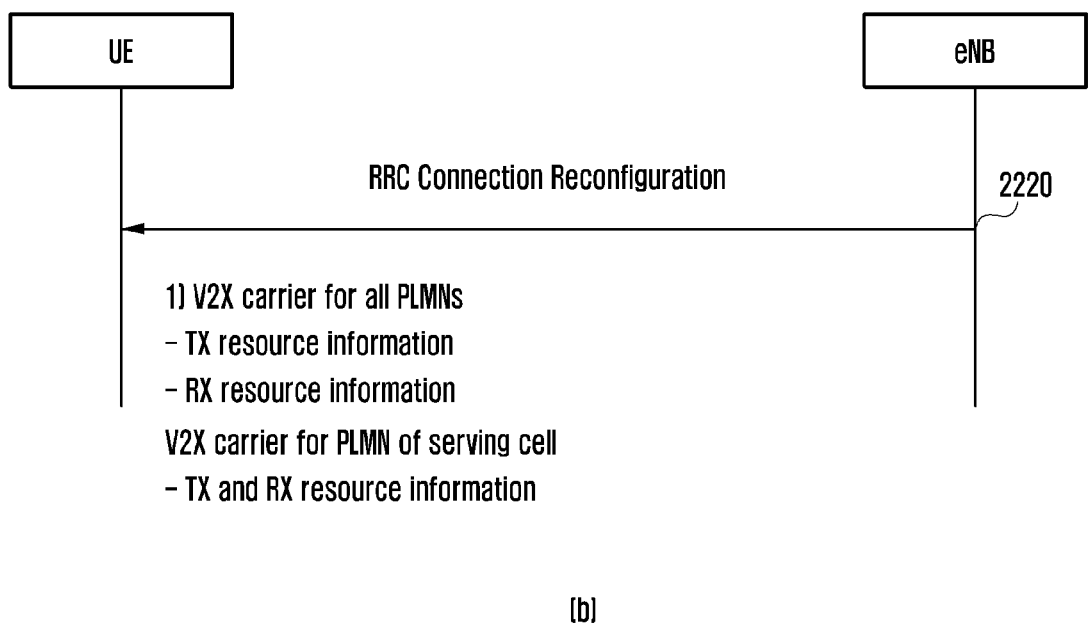
(b)

SIGNAL TRANSMISSION METHOD AND DEVICE OF TERMINAL IN WIRELESS MOBILE COMMUNICATION SYSTEM

CROSS-REFERENCE TO RELATED APPLICATIONS

This application is a 371 National Stage of International Application No. PCT/KR2017/012417 filed Nov. 3, 2017, which claims priority to Korean Patent Application No. 10-2016-0146077, filed Nov. 3, 2016, Korean Patent Application No. 10-2017-0000908, filed Jan. 3, 2017, and Korean Patent Application No. 10-2017-0101918, filed Aug. 10, 2017, the disclosures of which are herein incorporated by reference in their entirety.

BACKGROUND

1. Field

The present invention relates to a wireless communication system and, in particular, to a signal transmission method and device of a terminal in the wireless communication system.

2. Description of Related Art

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

Meanwhile, a wireless communication system is designed to support data transmission of a terminal (e.g., pedestrian user equipment (P-UE) and vehicle UE (V-UE)). There is a need of a method for increasing a message transmission probability of the terminal.

SUMMARY

The present invention aims to provide an efficient signal transmission method and procedure of a terminal in a wireless communication system.

In accordance with an aspect of the present invention, a method of a terminal in a wireless communication system includes receiving information on sharing resource of scheduling resources and sensing resources, receiving changed resource information according to a connection or disconnection of a terminal that does not support resource sharing, and transmitting or receiving data according to changed resource information.

In accordance with another aspect of the present invention, a method of a base station in a wireless communication system includes transmitting information on sharing resource of scheduling resources and sensing resources, transmitting changed resource information according to a connection or disconnection of a terminal that does not support resource sharing, and transmitting/receiving data according to changed resource information.

In accordance with another aspect of the present invention, a terminal in a wireless communication system includes a transceiver and a controller configured to control to receive information on sharing resource of scheduling resources and sensing resources, receive changed resource information according to a connection or disconnection of a terminal that does not support resource sharing, and transmit or receive data according to changed resource information.

In accordance with still another aspect of the present invention, a base station of a wireless communication system includes a transceiver and a controller configured to control to transmit information on sharing resource of scheduling resources and sensing resources, transmit changed resource information according to a connection or disconnection of a terminal that does not support resource sharing, and transmit/receive data according to changed resource information.

The efficient signal transmission method of a terminal that is proposed in the present invention is advantageous in terms of improving service reliability by increasing a battery life time of the terminal. The efficient signal transmission method of the present invention is also advantageous in terms of saving battery power of the terminal in use for a communication service.

BRIEF DESCRIPTION OF THE DRAWINGS

FIG. 4 is a diagram for explaining a second method for determining a sensing period according to a remaining power or a remaining power level of a P-UE according to an embodiment of the present invention;

FIG. 9 is a diagram illustrating a method for dividing resources randomly selected based on a remaining power level of a P-UE according to an embodiment of the present invention;

FIG. 16 is a diagram illustrating an exemplary method for determining a ratio of transmission resources of a P-UE according to an embodiment of the present invention;

FIG. 22 is a signal flow diagram illustrating a procedure for a serving base station to transmit information on resources of neighboring operators to a UE according to an embodiment of the present invention;

DETAILED DESCRIPTION

Figure 1:
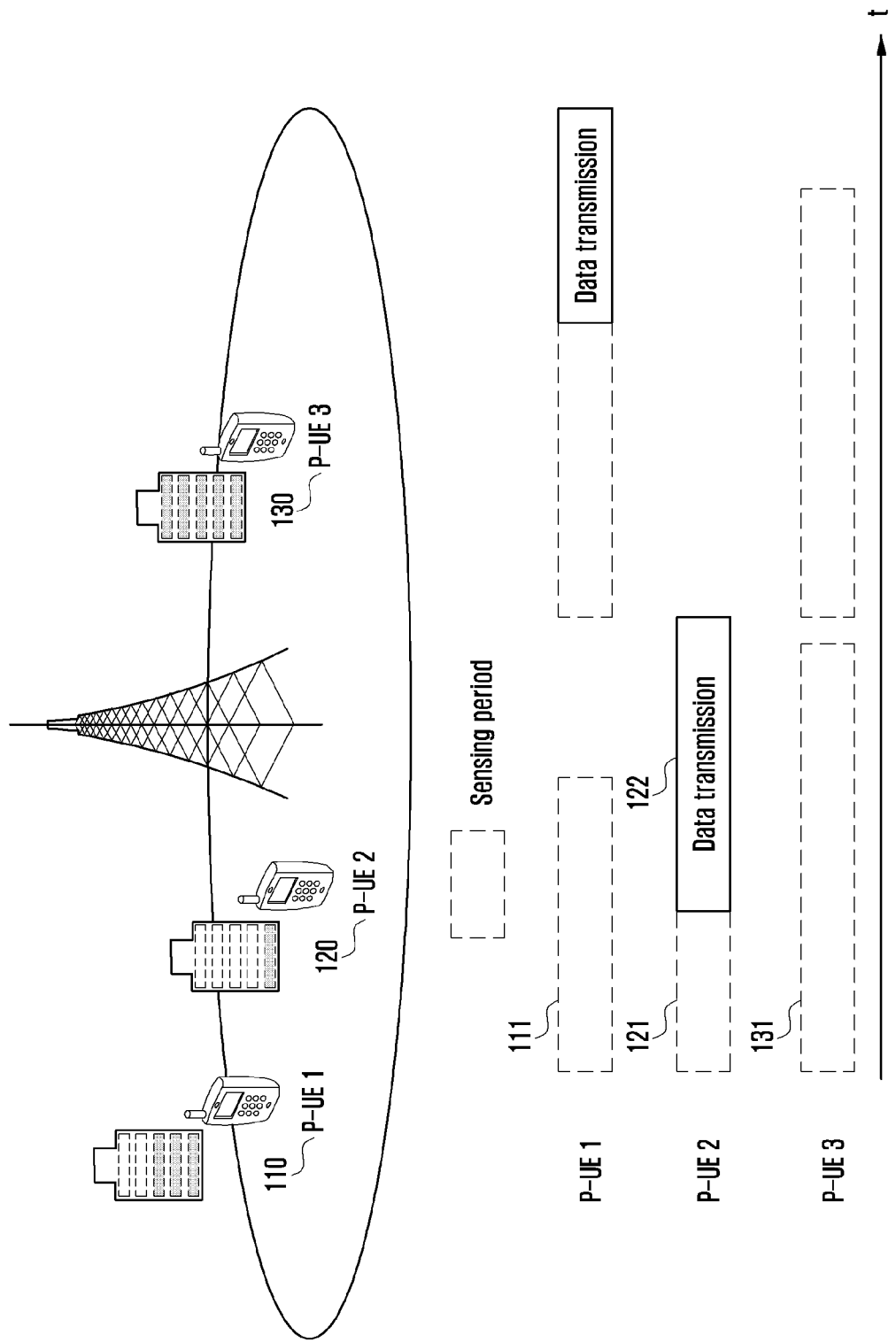
FIG. 1 is a diagram illustrating a first method for determining a sensing period according to a remaining power or a remaining power level of a P-UE according to an embodiment of the present invention.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

A wireless communication system supports data transmission of a P-UE and a V-UE. The P-UE may operate in different ways according to whether it has a sidelink RX capability. A P-UE having no sidelink RX capability performs random selection of communication resources to transmit data, and a P-UE having the sidelink RX capability performs partial sensing to transmit data.

The partial sensing is a sensing scheme for monitoring transmission resources during part of a predetermined sensing period with no necessity to monitor the full sensing period. Whether the UE uses the partial sensing scheme or a random selection scheme is determined based on the UE capability. That is, if the UE supports only the random selection scheme, it may be configured to monitor the resources using the random selection scheme. If the UE supports the partial sensing scheme, it may be configured to monitor the resources using the partial sensing scheme as well as the random selection scheme.

The signaling being exchanged between the UE and a base station to determine the sensing scheme of the UE may include at least one of UE capability request/UE capability information (UE capability req/info), sidelink UE information request/response (Sidelink UE information req/rsp), and UE information request/response.

In the case where the random selection scheme and the partial sensing scheme are commonly applied to all of the P-UEs located within a cell, whether to use the random selection scheme or the partial sensing scheme may be determined based on the battery capacity or service priority of the P-UE. The remaining power of the terminal is likely to differ according to the battery capacity of the UE and the service in use by the UE, and the UE running short on remaining power is likely to have less data transmission opportunities than the UE having enough remaining power. Considering that the data being transmitted by the P-UE are typically safety-related messages, it is necessary to increase the transmission probability of the message of the P-UE as far as possible. There is therefore a need of a method for giving a data transmission opportunity to a P-UE with low remaining power or a P-UE with low remaining power and a high service priority.

FIG. 1 is a diagram illustrating a first method for determining a sensing period according to a remaining power or a remaining power level of a P-UE according to an embodiment of the present invention.

In FIG. 1, P-UE 1 110 has a medium remaining power level, P-UE 2 120 has a low remaining power level, and P-UE 3 has a high remaining power level.

The remaining power may be determined in comparison with an absolute value of a battery capacity of a UE or as a ratio to a UE battery capacity (remaining battery capacity to whole battery capacity). Meanwhile, the remaining power level may be determined by comparing the absolute value of the UE battery capacity or a ratio to the UE battery capacity to a predetermined threshold value.

According to an embodiment of the present invention, a terminal with a low remaining power or remaining power level may be configured with a short sensing period, and a terminal with a high remaining power or remaining power level may be configured with a low sensing period. Although classified into three categories (low, medium, and high) in the present invention, the remaining power levels may be classified into more levels.

In FIG. 1, it is assumed that all of P-UE 1 110, P-UE 2 120, and P-UE 3 130 have data to transmit. In this case, P-UE 2 120 with the lowest remaining power or remaining power level determines whether the resources are available for the shortest sensing period 121. If it is determined that the resources are available, P-UE 2 120 selects the resources to transmit data 122.

Meanwhile, because P-UE 1 110 and P-UE 2 130 have respective sensing periods 111 and 131 that are longer than the sensing period of P-UE 2 120, they can sense the data transmission of P-UE 2 during their sensing periods. Accordingly, P-UE 1 110 and P-UE 3 130 cannot start data transmission even when their sensing periods expire.

In order for the base station to configure a remaining power of UE-specific sensing period that varies according to the residual power, the UE has to report its remaining power amount (absolute amount) or remaining power level (relative amount) to the base station.

The UE may be configured to report, to the base station, its remaining power amount or remaining power level periodically or when its remaining power amount drops below a predetermined level or its remaining power level changes. Upon receipt of the remaining power amount or remaining power level report, the base station may configure the sensing period during which the UE is capable of sensing a transmit resources pool.

Figure 2:
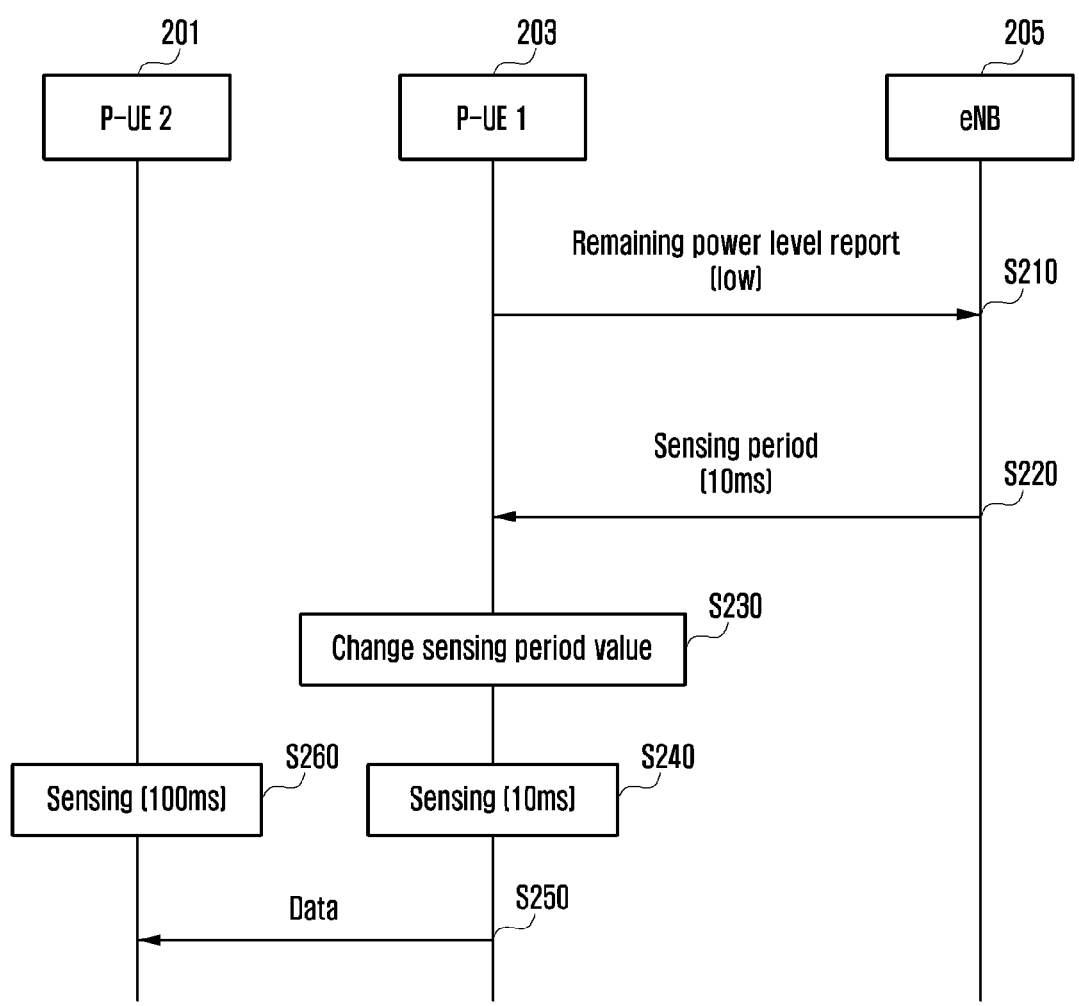
FIG. 2 is a signal flow diagram illustrating the first method according to an embodiment of the present invention.

FIG. 2 is a signal flow diagram illustrating the first method according to an embodiment of the present invention.

In FIG. 2, it is assumed that P-UE 1 203 and P-UE 2 201 currently have the same sensing period of 100 ms.

The remaining power level P-UE 1 203 becomes low, P-UE 1 220 reports the change of its remaining power level to a base station at step S210.

Upon receipt of the report indicating the change of the remaining power level from P-UE 1, the base station changes the sensing period of P-UE 1 based on the changed remaining power level and sends a changed sensing period value to the P-UE 1 at step S210. In this embodiment, it is assume that the sensing period corresponding to the low level is 10 ms.

Upon receipt of a message carrying the changed sensing period value, the P-UE 1 203 may change its sensing period value at step S230. That is, the P-UE 1 203 may set its sensing period to 10 ms.

Then, the P-UE 1 203 may sense the resources at step S240 during the sensing period of 10 ms to determine whether the resources are available and, if they are available, transmit data at step S250.

In the case where both P-UE 1 203 and P-UE 2 201 have data to transmit, P-UE 1 203 having the sensing period of 10 ms shorter than that of P-UE 1 203 (e.g., 100 ms as denoted by reference number S260) can transmit the data. Although the remaining power level is reported in this embodiment, the present invention is applicable to the case where the UE reports its remaining power.

Figure 3:
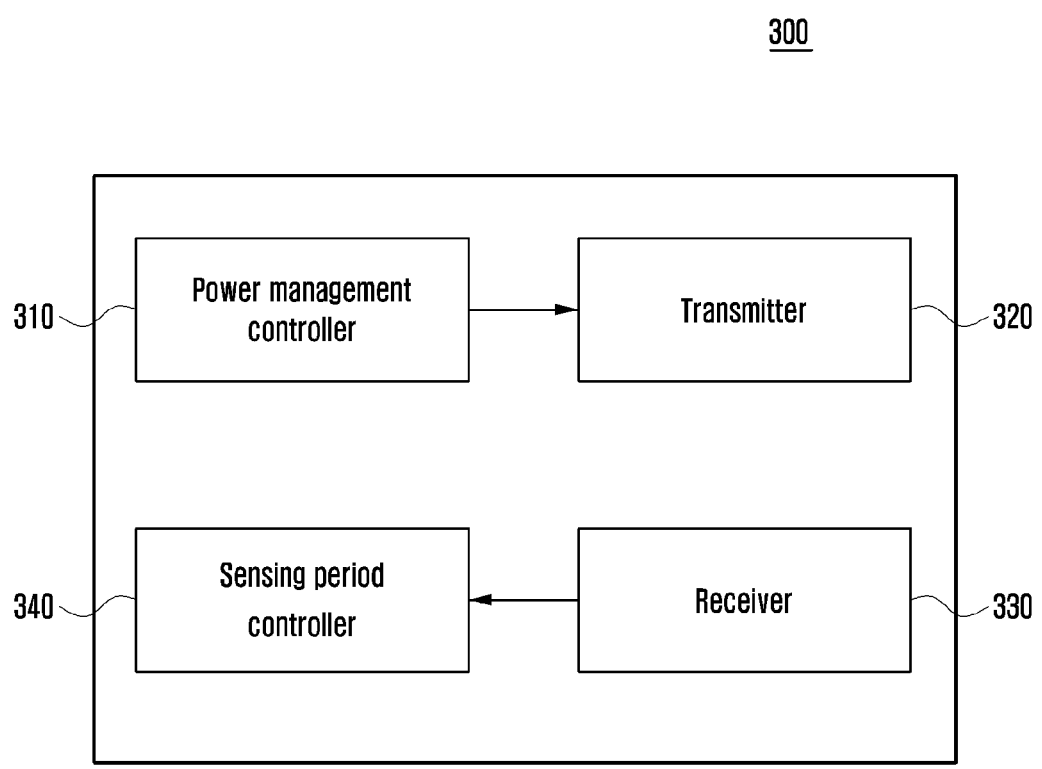
FIG. 3 is a block diagram illustrating a configuration of a UE for performing the first method according to an embodiment of the present invention.

FIG. 3 is a block diagram illustrating a configuration of a UE for performing the first method according to an embodiment of the present invention.

A power management controller 310 may manage the remaining power or remaining power level of the UE 300 to transmit, if the remaining power becomes less than a predetermined threshold value or the remaining power level changes, a change indication to a base station by means of a transmitter (TX) 320.

If the remaining power change information or remaining power level change information is received from the power management controller 310, the transmitter (TX) 320 may transmit the changed remaining power or changed remaining power level information to the base station.

A receiver (RX) 330 may receive sensing period information of the UE from the base station and send the sensing period information to a sensing period controller 340.

Upon receipt of the sensing period information from the receiver (RX) 330, the sensing period controller 340 may send a sensing device of the terminal an indication providing an instruction to monitor the resources for P-UEs during the corresponding sensing period.

Although not depicted in the drawing, the power management controller 310 and the sensing period controller 340 may be integrated into a signal controller. In this case, the controller may also include other components such as a sensing unit in addition to the power management controller and the sensing period controller.

FIG. 4 is a diagram for explaining a second method for determining a sensing period according to a remaining power or a remaining power level of a P-UE according to an embodiment of the present invention.

The second method differs from the first method, in which the base station determines the sensing period and notifies the UE of the sensing period, in that the UE adjusts its sensing period based on its remaining power or remaining power level autonomously.

The table depicted in FIG. 4 shows sensing periods corresponding to respective remaining powers (or respective remaining power levels). Although the table lists the sensing periods corresponding to respective remaining powers in the drawing, the present invention is not limited to this embodiment and may include other embodiments in which the sensing periods are determined in association with remaining power levels. The UE may calculate its remaining power level or remaining power and determine a sensing period that corresponds to the remaining power level or remaining power. The UE may sense a transmit resources pool during the determined sensing period and transmit data using the resources sensed as available. However, the present invention is not limited to this embodiment and may include other embodiments in which the mapping relationship between the remaining powers or remaining power levels and sensing periods may be stored in the UE in a form other than a table.

The information depicted in FIG. 4 may be stored in a base station, which is capable of determining the sensing period based on this information using the first method.

Figure 5:
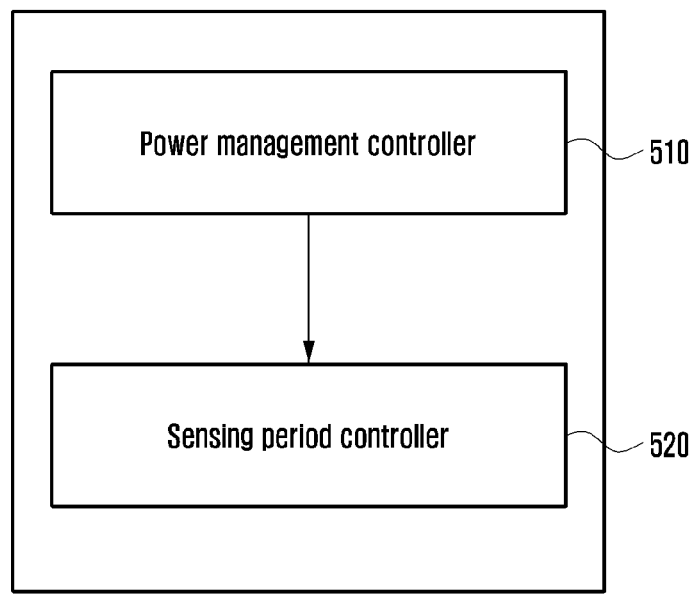
FIG. 5 is a block diagram illustrating a configuration of a UE for performing the second method according to an embodiment of the present invention.

FIG. 5 is a block diagram illustrating a configuration of a UE for performing the second method according to an embodiment of the present invention.

A power management controller 510 may manage the remaining power or remaining power level of the UE to send, if the remaining power becomes less than a predetermined threshold value or the remaining power level changes, a change indication to a sensing period controller 520.

If the remaining power change information or remaining power level change information is received from the power management controller 510, the sensing period controller 520 may retrieve sensing period information corresponding to the new remaining power or remaining power level from the table of FIG. 4. The sensing period controller 520 may send a sensing device of the terminal an indication providing an instruction to monitor the resources for P-UEs during the corresponding sensing period.

Figure 6:
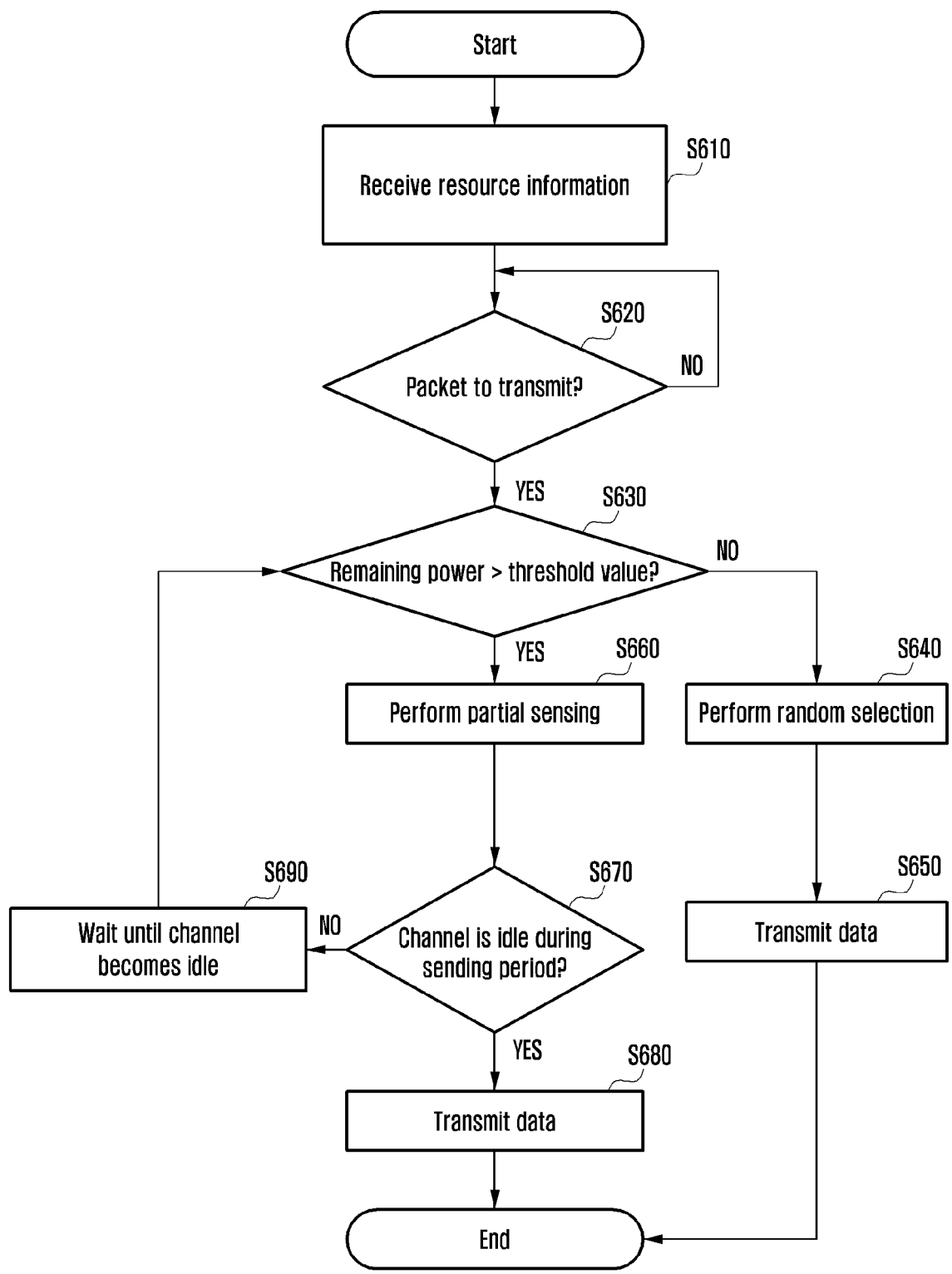
FIG. 6 is a flowchart illustrating a first method of selecting resources for data transmission based on a remaining power or remaining power level of a P-UE according an embodiment of the present invention.

Although not depicted in the drawing, the power management controller 510 and the sensing period controller 520 may be integrated into a signal controller. In this case, the controller may also include other components such as a sensing unit in addition to the power management controller and the sensing period controller. Although not depicted in the drawing, the UE may include other entities such as a transceiver and a storage unit. FIG. 6 is a flowchart illustrating a first method of selecting resources for data transmission based on a remaining power or remaining power level of a P-UE according an embodiment of the present invention.

In reference to FIG. 6, the UE may receive resources information at step S610. In detail, the UE may receive resources information for random selection and resources information for partial sensing.

Next, the UE may determine at step S620 whether it has data to transmit. If the UE has data to transmit, it may check its remaining power or remaining power level.

Next, the UE may determine at step S630 whether the remaining power or remaining power level is greater than a threshold value. Although the drawing depicts that the remaining power is compared with the threshold value, the present invention is not limited to this embodiment.

If it is determined that the remaining power or remaining power level is equal to or less than the threshold value, the UE may select transmit resources via a random selection scheme at step S640 and transmit the data on the selected resources at step S650.

If it is determined that the remaining power or remaining power level is greater than the threshold value, the UE may select transmit resources via a partial sensing scheme at step S660 to transmit data on the selected resources.

In detail, if it is determined to use the partial sensing scheme, the UE may monitor the transmit resources during a partial sensing period. The UE may monitor the transmit resources to determine at step S670 whether a channel is idle during the partial sensing period.

If it is determined that the transmit resources are available after the sensing period (if the channel is idle), the UE may select the transmit resource to transmit the data at step S680.

If it is determined that the transmit resources are not available after the sensing period (if the channel is not idle), the UE waits at step S690 until the transmit resources become idle.

The above procedure corresponds to the method for selecting data transmission resources according to the remaining power or remaining power level under the assumption that the partial sensing scheme has a power consumption greater than that of the random selection scheme.

Figure 7:
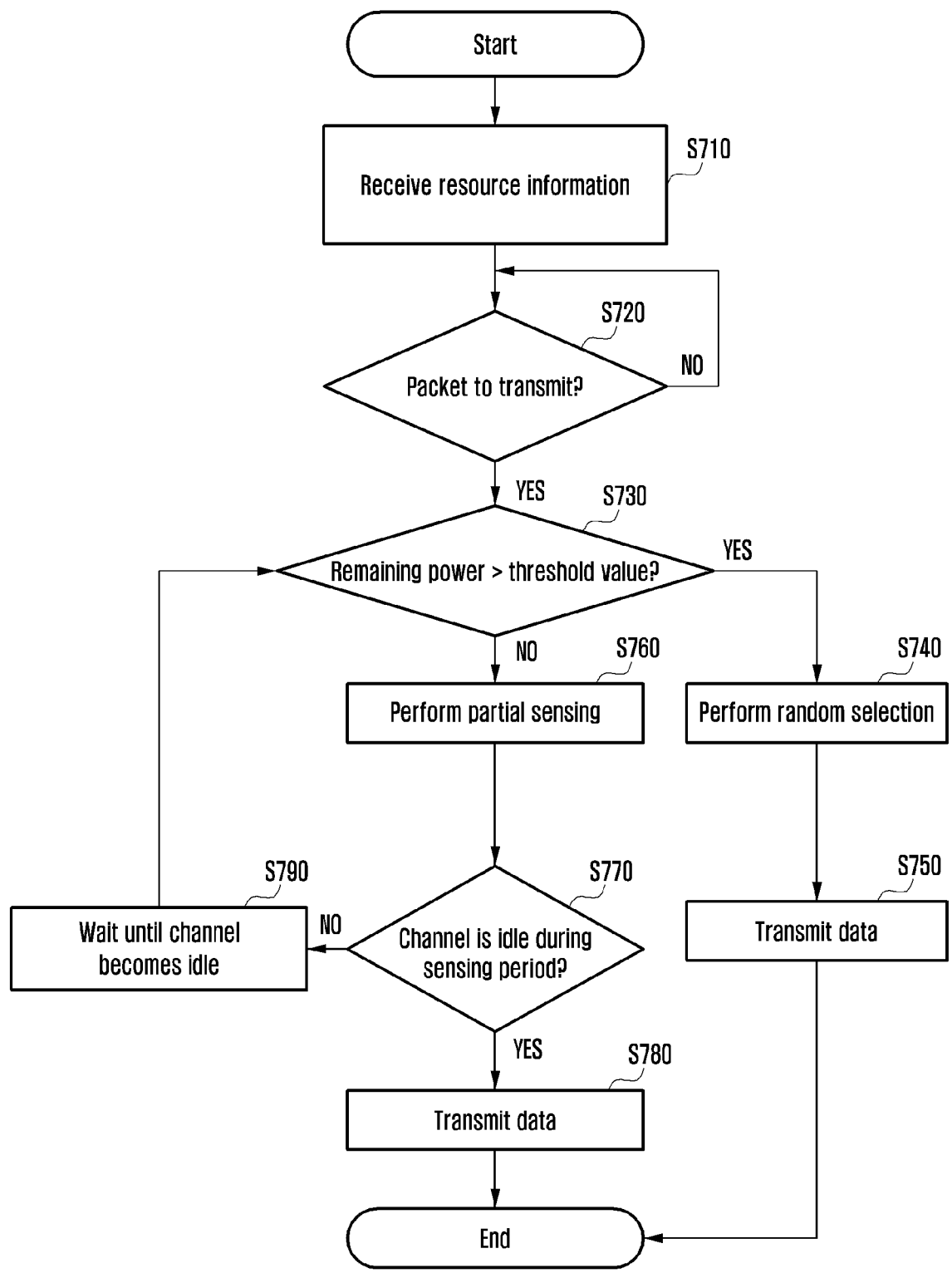
FIG. 7 is a diagram illustrating a second method of selecting resources for data transmission based on a remaining power or remaining power level of a P-UE according to an embodiment of the present invention.

FIG. 7 is a diagram illustrating a second method of selecting resources for data transmission based on a remaining power or remaining power level of a P-UE according to an embodiment of the present invention.

In FIG. 7, the resources for transmitting data are selected based on the remaining power or remaining power level of the P-UE under the assumption that the partial sensing scheme consumes less power than the random selection scheme.

Steps S710 to S730 of FIG. 7 are identical with steps S610 to S630 and thus detailed descriptions thereof are omitted herein.

If the remaining power or remaining power level is not satisfied to the extent necessary for use of the partial sensing scheme, i.e., if the remaining power or remaining power level is greater than a threshold value, the UE may use the random selection scheme to select transmission resources at step S740 and transmit data, at step S750, using the selected resources.

If it is determined that the remaining power or remaining power level is satisfied to the extent necessary for use of the partial sensing scheme, i.e., if the remaining power or remaining power level is equal to or less than the threshold value, the UE may use the partial sensing scheme at step S760 to select resources and transmit data using the selected resources. Steps S760 to S790 are identical with steps S660 to S690 of FIG. 6 and thus detailed descriptions thereof are omitted herein.

Figure 8:
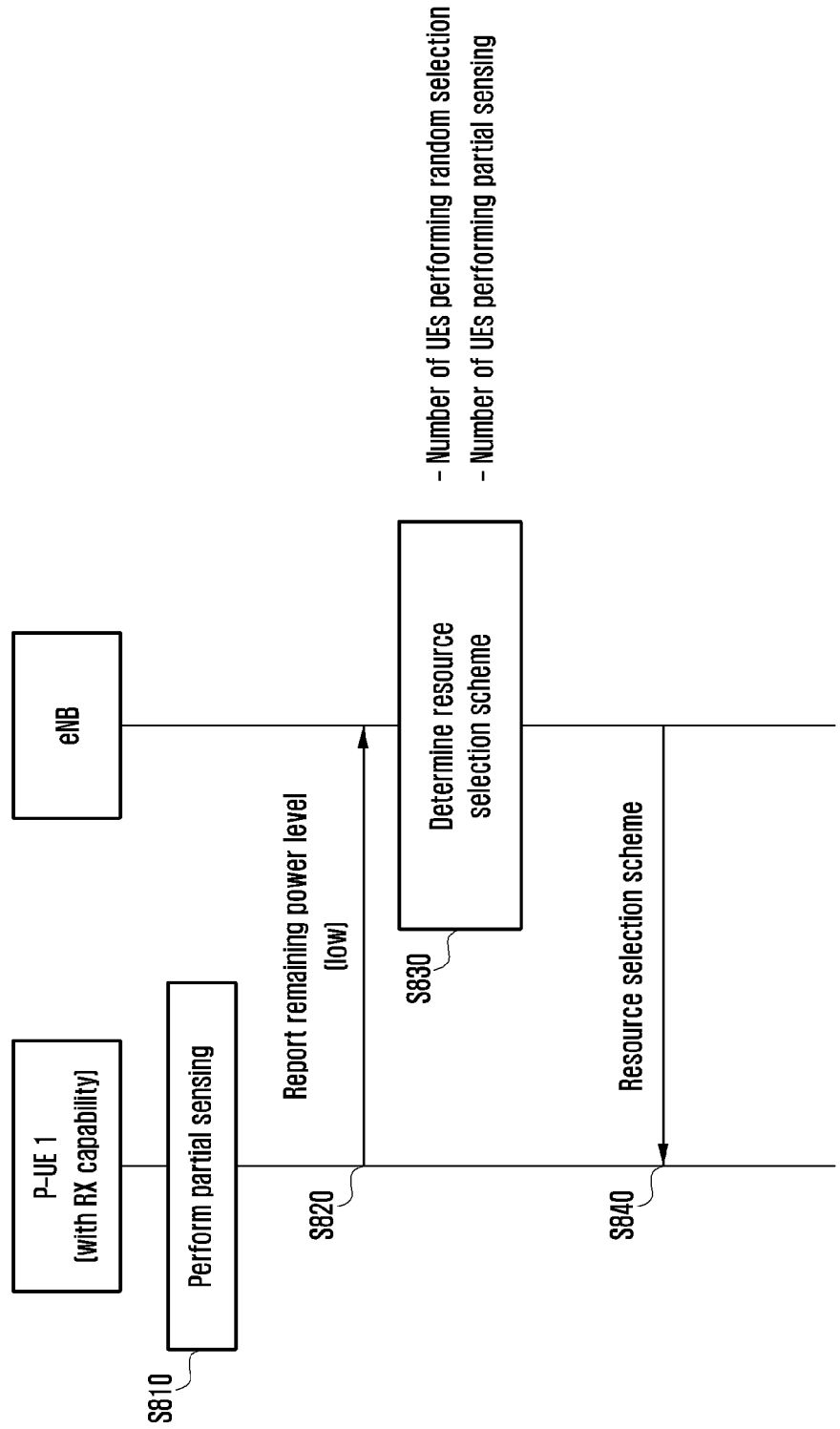
FIG. 8 is a signal flow diagram illustrating a third method of selecting resources for data transmission based on remaining powers or remaining power levels of P-UEs according to an embodiment of the present invention.

FIG. 8 is a signal flow diagram illustrating a third method of selecting resources for data transmission based on remaining powers or remaining power levels of P-UEs according to an embodiment of the present invention.

In reference to FIG. 8, the UE may perform a partial sensing at step S810.

At step S820, the UE transmits information to a base station indicating that its remaining power level is changed to low.

Then, the base station may make a resource selection scheme determination at step S830. The base station may configure the corresponding UE to operate in one of a random selection scheme or a partial sensing scheme with various conditions.

For example, one of the various conditions may be to compare a number of UEs operating in the random selection scheme and a number of UEs operating in the partial sensing scheme and choose the scheme in use by more UEs. For example, in the case where a UE that uses the partial sensing scheme transmits a message indicating that its power level is changed to low, if the number of UEs that currently use the partial sensing scheme is less than a predetermined threshold value, the base station may control the UE to continue using the partial sensing scheme.

Another condition may be to make the determination based on the remaining power level of the UE. For example, assuming that the remaining power is classified into three levels (low, medium, and high), the partial sensing scheme is used for the two highest levels (medium and high) while the random selection scheme is used for the lowest level (low).

The base station may choose one of the random selection and partial sensing scheme based on location information of the UE. In this case, the UE transmits its location information to the base station. The base station notifies the UE of the scheme for use by the UE in a location-specific manner (or base station-specific manner). By way of example, in a hotspot where a large number of UEs are concentrated, if the base station prefers the partial sensing scheme for reducing transmission collisions among the UEs, it may control the UE located at a predetermined position to use the partial sensing scheme. By way of another example, in an area where no large number of UEs are expected such as a suburb, if the base station prefers the random selection scheme, it may control the UE located in the corresponding area to use the random selection scheme. In this way, the base station is capable of determining a resource selection scheme of a UE based on the location information of the UE.

According to another embodiment, the UE may report its remaining power amount to the base station. If the remaining power amount of the UE is less than a predetermined threshold, the base station may instruct the UE to select resources in the random selection scheme According to another embodiment, the UE may report its remaining power amount to the base station. If the remaining power amount is less than a predetermined threshold value, the base station may instruct the UE to select resources in the partial sensing scheme.

Next, the base station may notify the UE of the resource selection scheme at step S840. The base station may transmit to the terminal a message indicating that the resource selection scheme is changed.

FIG. 9 is a diagram illustrating a method for dividing resources randomly selected based on a remaining power level of a P-UE according to an embodiment of the present invention.

Part (a) of FIG. 9 depicts an exemplary case where 4 P-UEs are located within the coverage area of a base station. Here, it is assumed that the remaining power levels of P-UE 2 903 and P-UE 4 907 are low, the remaining power level of P-UE 1 is medium, and the remaining power level of P-UE 3 905 is high. Each of the UEs may report its remaining power level to the base station. The base station may divide random selection resources based on the remaining power levels transmitted by the UEs.

For example, the base station may identify numbers of UEs with respective remaining power levels and divide the resources according to the numbers of the remaining power level-specific UEs. As shown in part (a) of FIG. 9, because the ratio among numbers of UEs having the low, medium, and high remaining power levels is 2:1:1, the base station may divide the random resources in the ratio of 2 (for low): 1 (for medium): 1 (for high) as denoted by reference numbers 910, 920 and 930.

In this state, if the remaining power of one of the UEs varies according to a change in its situation (e.g., charging), the UE may report the change in its remaining power level to the base station. The base station may re-divide the random selection resources at a predetermined time interval based on remaining power level change messages received at a predetermined interval from the UEs.

For example, if P-UE 2 and P-UE 4 are newly charged as denoted by reference number 943 and 947 as show in part (b) of FIG. 9, their remaining power levels are changed. As a consequence, the ratio among the numbers of UEs having the low, medium, and high remaining power levels becomes 0:1:1, and the base station may divide the random resources in the ratio of 0 (for low): 1 (for medium): 1 (for high) as denoted by reference numbers 950 and 960.

According to an embodiment, it may be possible to apply level-specific weights as well as numbers of UEs as values for determining random selection resources. For example, if the number of the UEs with the low remaining power level is multiplied by a weight of 0.5, the number of the UEs with the medium remaining power level is multiplied by a weight of 0.3, and the number of the UEs with the high remaining power level is weighted by a weight of 0.2, the random selection resources may be divided in the ratio of 2*0.5 (for low): 2*0.3 (for medium): 1*0.2 (for high) in the situation of part (a) of FIG. 9. However, the present invention is not limited to the disclosed embodiment and may include embodiments in which different weight values are applied.

Figure 10:
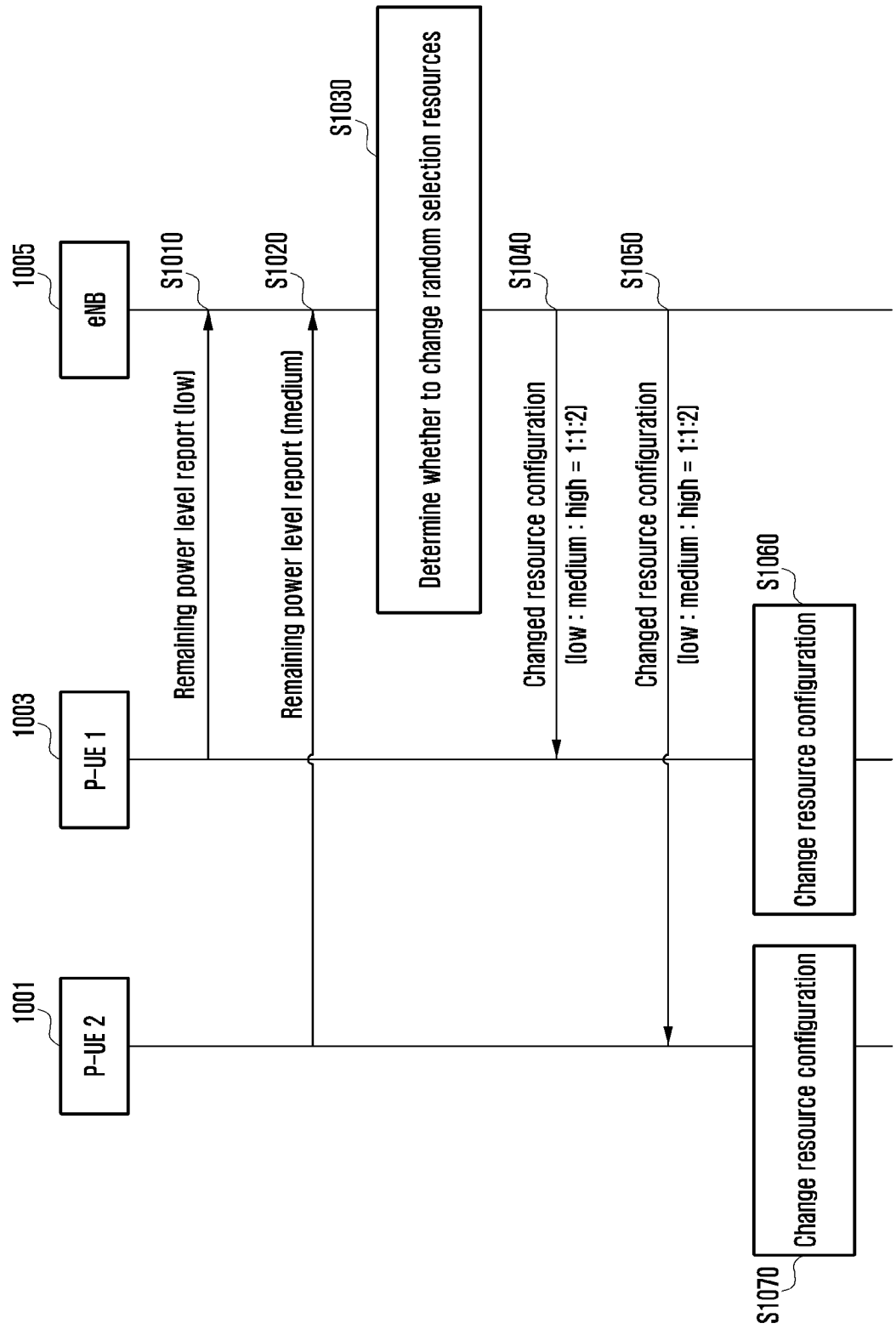
FIG. 10 is a signal flow diagram illustrating a method for dividing random selection resources based on remaining powers or remaining power levels of P-UEs according to an embodiment of the present invention.

FIG. 10 is a signal flow diagram illustrating a method for dividing random selection resources based on remaining powers or remaining power levels of P-UEs according to an embodiment of the present invention.

P-UE 1 and P-UE 2 report their remaining powers or remaining power levels (e.g., low and medium) to a base station at steps S1010 and S1020. Although it is directed to an exemplary case of using the remaining power level, it is obvious that the remaining power may be used instead of the remaining power level.

The base station determines whether to change current random selection resources based on remaining power level change messages received from the UEs in a predetermined duration. The random selection resource may be changed according to the method described with reference to FIG. 9.

If it is necessary to change the current random selection resources, the base station may transmit random selection resources division change information to the UEs at steps S1040 and S1050. The UEs changes their resources configurations at steps S1060 and S1070 and select resources based on the changed random selection resources division information via the random selection scheme to transmit data on the selected resources.

Figure 11:
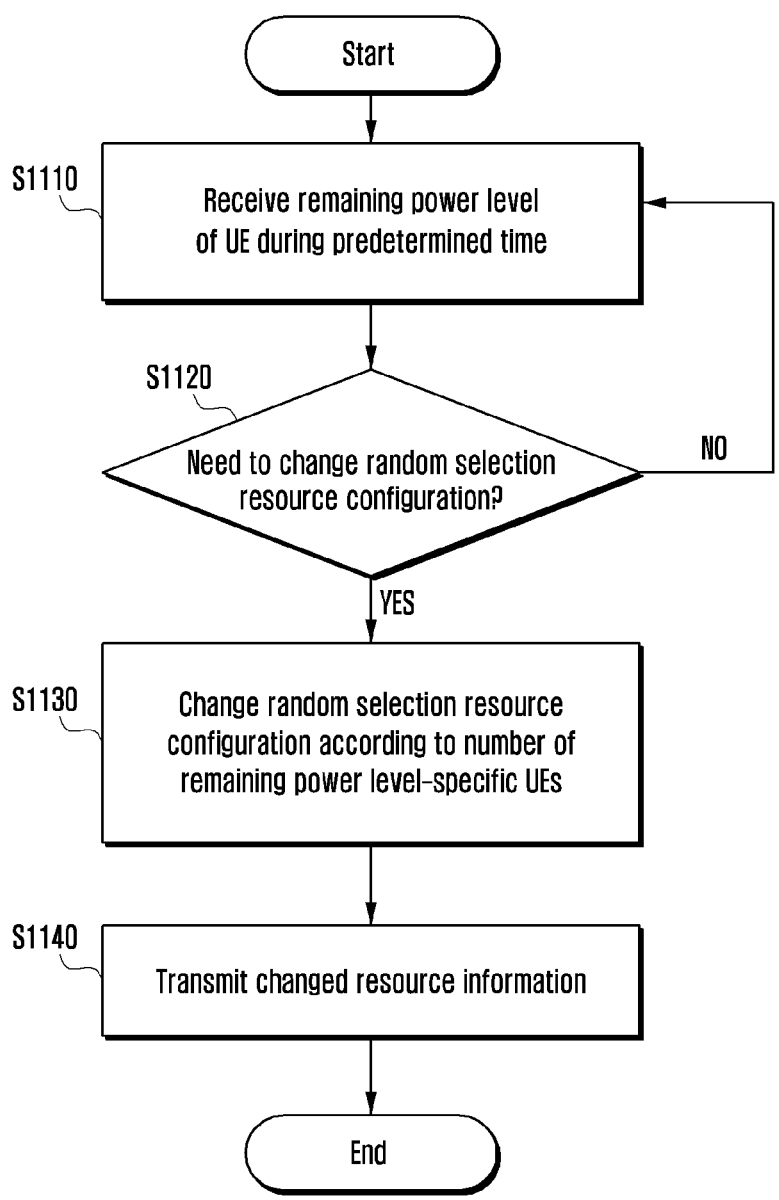
FIG. 11 is a flowchart illustrating an operation of a base station in a method for dividing random selection resources based on remaining powers or remaining power levels of P-UEs according to an embodiment of the present invention.

FIG. 11 is a flowchart illustrating an operation of a base station in a method for dividing random selection resources based on remaining powers or remaining power levels of P-UEs according to the third embodiment of the present invention.

At step S1110, the base station receives remaining power levels of UEs during a predetermined time period to identify the number of UEs of which the remaining power levels have changed.

At step S1120, the base station determines whether it is necessary to change the random selection resources configuration.

If it is necessary to change the configured random selection resources, the base station may change the random selection resources configuration at step S1130 according to the numbers of UEs with respective remaining power levels. Next, the base station transmits new resource information to the UEs at step S1140.

Figure 12:
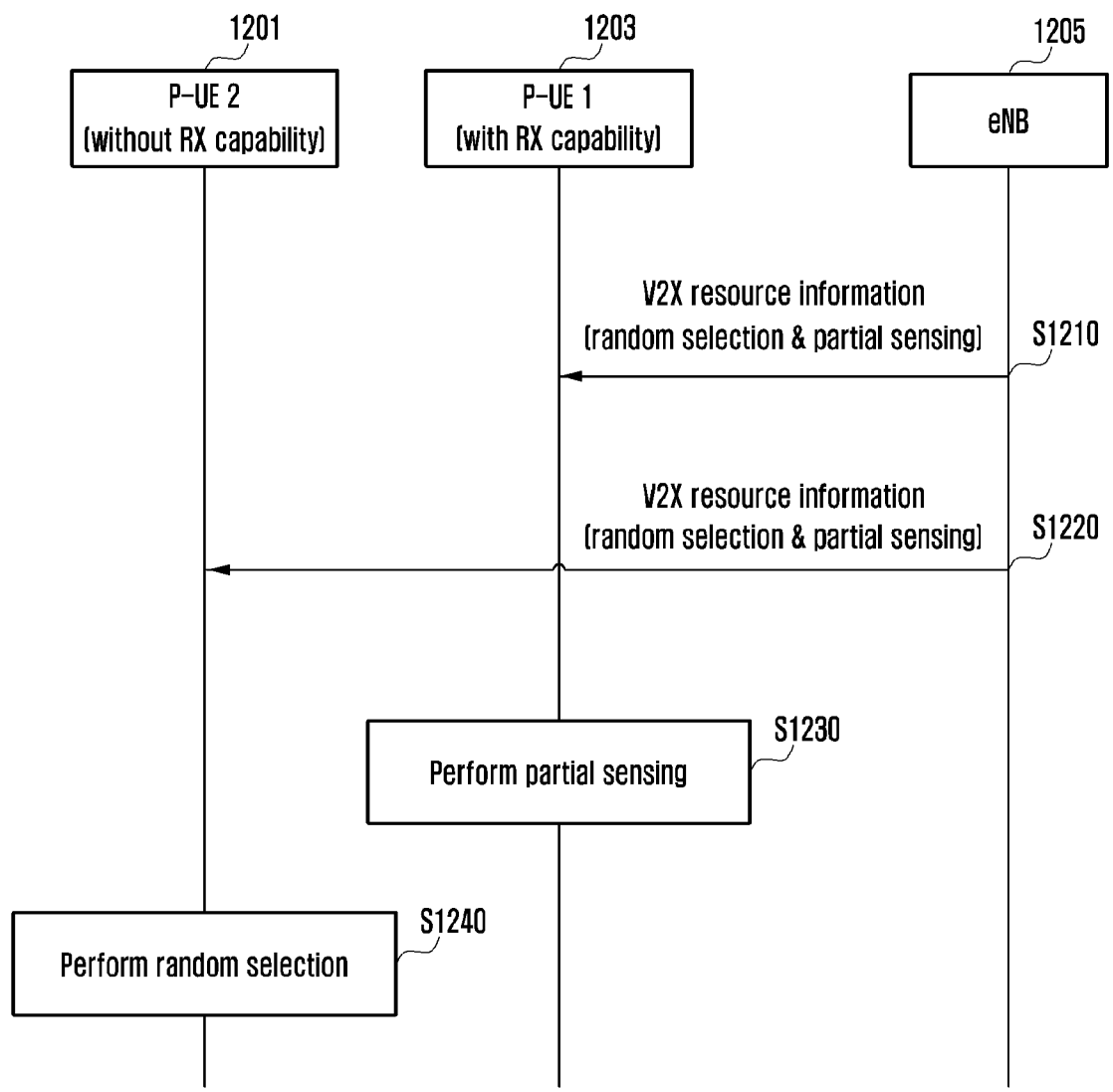
FIG. 12 is a signal flow diagram illustrating a first method for selecting a transmit resource selection scheme of a P-UE according to an embodiment of the present invention.

FIG. 12 is a signal flow diagram illustrating a first method for selecting a transmit resource selection scheme of a P-UE according to an embodiment of the present invention.

This embodiment is directed to a method for a P-UE to determine a transmit resources selection scheme based on its hardware performance. In this embodiment, a UE with a receive capability uses the partial sensing scheme while a UE with no receive capability uses the random selection scheme.

At steps S1210 and S1220, the base station 1205 transmits information on the resources for use in the random selection scheme and the resources for use in the partial sensing scheme to the UEs 1201 and 1203 in a broadcast manner.

Each UE may determine its resource selection method based on its hardware performance. Each UE may select resources via the determined resource selection method, i.e., one of the partial sensing scheme and the random selection scheme, according to this embodiment and transmit data on the selected resources.

That is, if the UE 1203 has the receive hardware capability, it may sense the resources, at step S1230, based on the information on the resources for the partial sensing scheme to transmit data on the selected resources.

If the UE 1201 has no receive hardware capability, it may select the resources, at step S1240, based on the information on the resources for the random selection scheme to transmit data on the selected resources.

Figure 13:
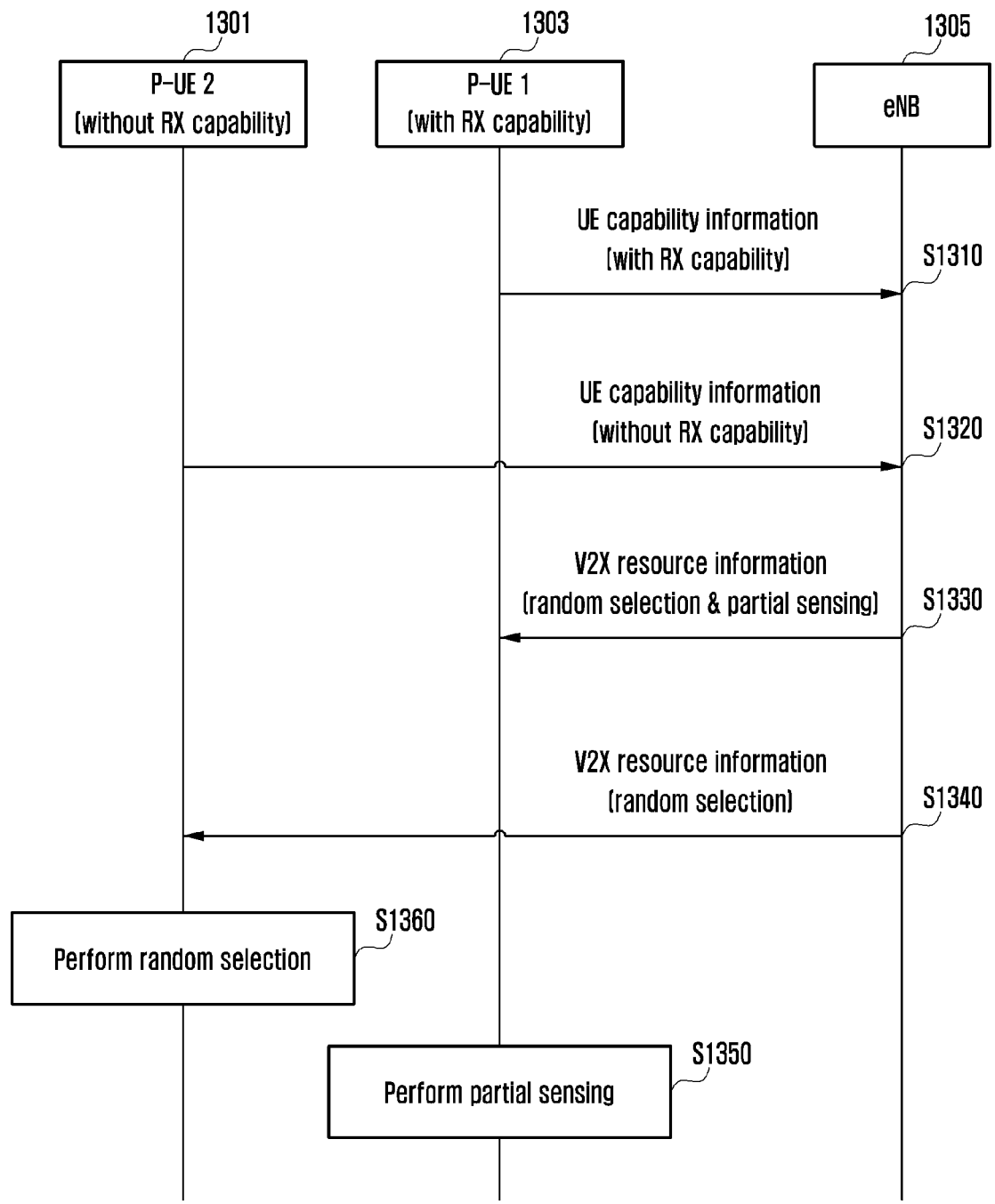
FIG. 13 is a signal flow diagram illustrating a second method for selecting a transmit resource selection scheme of a P-UE according to an embodiment of the present invention.

FIG. 13 is a signal flow diagram illustrating a second method for selecting a transmit resource selection scheme of a P-UE according to an embodiment of the present invention.

In this embodiment, P-UEs 1301 and 1303 transmit their UE capability information (hardware performance (e.g., having receive capability or not)) to a base station 1305 at steps 1310 and 1320. At steps S1330 and S1340, the base station 1305 may transmit information on the resources for use in the random selection scheme or the partial sensing scheme to the UEs according to the hardware performances of the UEs.

In reference to FIG. 13, the base station 1305 may transmit the information on the resources for use in the partial sensing scheme to P-UE 1 1303 having the receive capability and the information for use in the random selection scheme to P-UE 2 1301 having no receive capability. By way of another example, the base station may also transmit the information on the resources for use in the random selection scheme to the UE 1303.

As a consequence, P-UE 1 1303 may perform the partial sensing at step S1350, and P-UE 2 1301 may perform the random selection at step S1360. By way of another example, P-UE 1 1303 may perform the random selection at step S1350.

Figure 14:
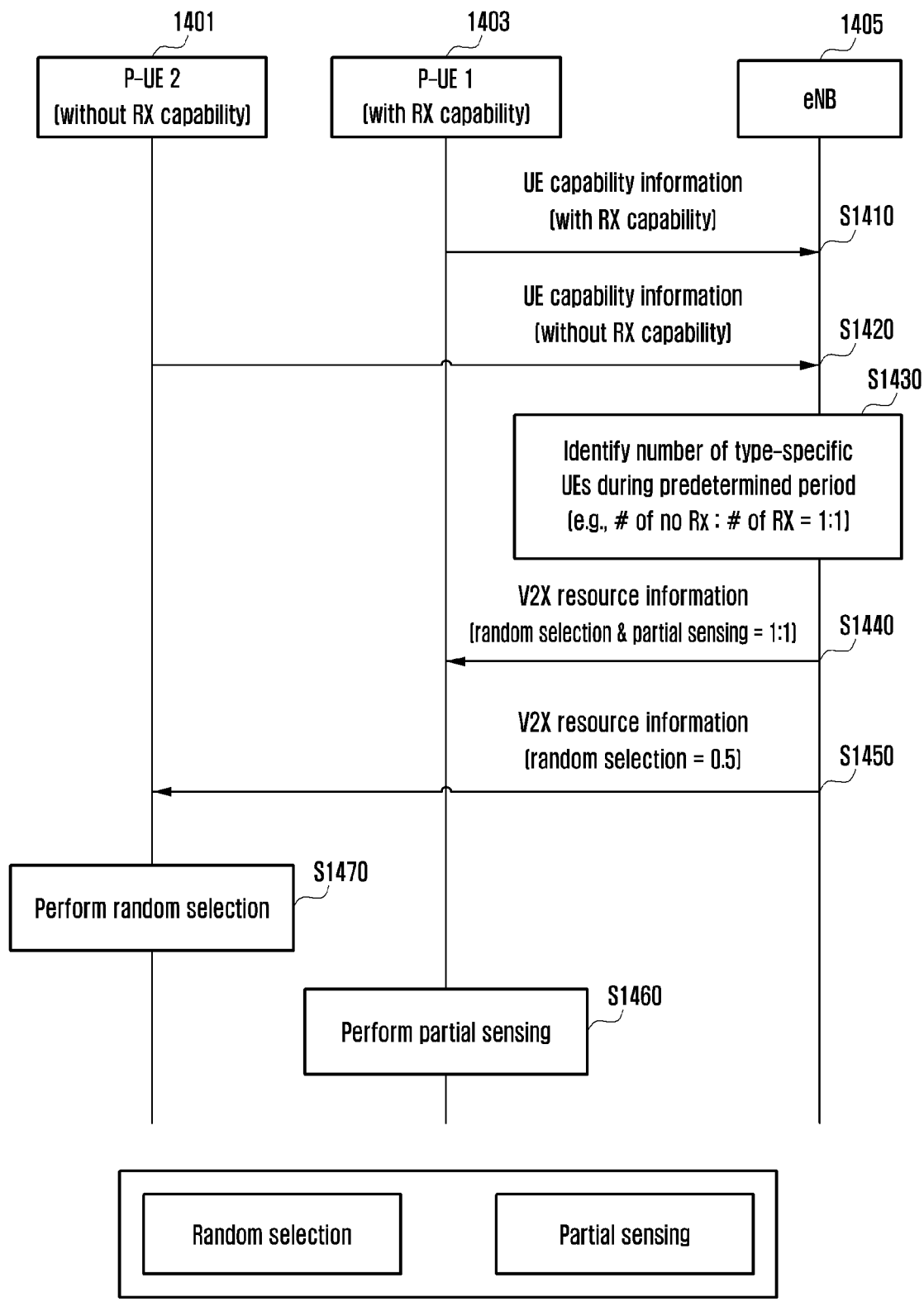
FIG. 14 is a signal flow diagram illustrating a third method for selecting a transmit resource selection scheme of a P-UE according to an embodiment of the present invention.

FIG. 14 is a signal flow diagram illustrating a third method for selecting a transmit resource selection scheme of a P-UE according to an embodiment of the present invention.

UEs 1401 and 1403 transmit their UE capability information (hardware performances) to a base station 1405 at steps S1410 and S1420.

The base station 1405 may check the UE capability information for a number of UEs with presence of a hardware performance and a number of UEs with absence of a hardware performance. In this embodiment, the UEs may be categorized into different types depending on the presence/absence of a hardware performance and identify the numbers of respective types of UEs. The base station 1405 determine a ratio between resources for use in the random selection scheme and resources for use in the partial sensing scheme based on the numbers of respective types of UEs. For example, if the ratio between the UEs without the receive capability (UEs that are supposed to use the random selection) and the UEs with the receive capability (UEs that are supposed to use the partial sensing) is 1:2, the base station may allocate the resources for use in the random selection scheme and the resources for use in the partial sensing scheme in the ratio of 1:2. That is, the base station may allocate more resources for the type of UEs outnumbering the other type of UEs.

In FIG. 14, the base station determines the ratio between the resources for use in the random selection scheme and the resources for use in the partial sensing scheme as 1:1 because the ratio between the UEs with the receive capability and the UEs without the receive capability is 1:1, and the base station transmits the corresponding information to the UEs at steps S1440 and S1450.

In this drawing, it is assumed that the resources for use in the random selection scheme and the resources for use in the partial sensing scheme are separated from each other. P-UE 1 1403 with the receive capability is capable of receiving partial sensing information, and P-UE 2 1401 without the receive capability is capable of receiving random selection information. Because P-UE 1 1403 is capable of using the random selection scheme, it may receive both the partial sensing information and the random selection information from the base station as depicted in the drawing.

Accordingly, P-UE 1 1403 may perform partial sensing at step S1460, and P-UE 2 1401 may perform ransom selection at step S1470. By way of another example, P-UE 1 1403 may perform the random selection at step S1460.

Figure 15:
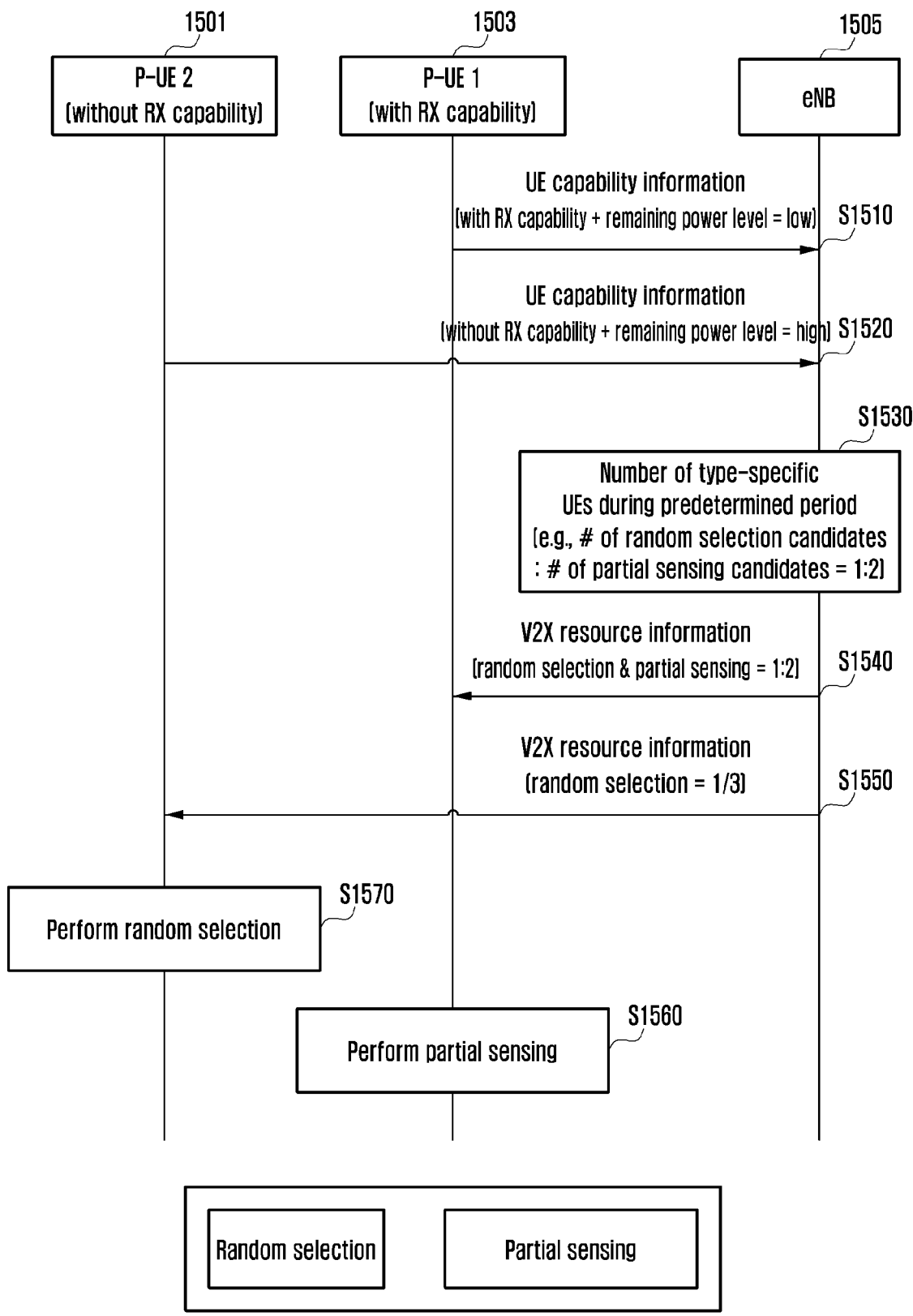
FIG. 15 is a signal flow diagram illustrating a fourth method for selecting a transmit resources selection scheme of a P-UE according to an embodiment of the present invention.

FIG. 15 is a signal flow diagram illustrating a fourth method for selecting a transmit resources selection scheme of a P-UE according to an embodiment of the present invention.

In this method, a base station uses remaining powers or remaining power levels of UEs as well as numbers of respective types of UEs for determining the resource ratio. That is, the base station may determine the resource ratio based on per-UE hardware capabilities and the remaining powers or remaining power levels of the UEs.

In reference to FIG. 15, UEs 1501 and 1503 may transmit their UE capability information to a base station 1505 at step S1510 and S1520. Here, the UE capability information may include a receive capability and a remaining power or remaining power level. Although the drawing depicts that the remaining power level is in use, the present invention may also include embodiments in which the remaining power is in use.

At step S1530, the base station 1505 may identify numbers of respective types of UEs during a predetermined period. Next, the base station may determine a ratio between random selection resources and partial sensing resources based on the numbers of respective types of UEs and the remaining power levels of the UEs. In the drawing, it is assumed that the ratio between the random selection resources and the partial sensing resources is determined as 1:2. A method for determining resources based on the number of UEs and the remaining power levels of the UEs is described later.

At steps S1540 and S1550, the base station may transmit corresponding resource information to the UEs 1501 and 1503.

P-UE 1 1503 that has the receive capability is capable of receiving the partial sensing information, and P-UE 2 1501 that does not have the receive capability is capable of receiving the random selection information. Because P-UE 1 1503 is capable of using the random selection scheme, it may receive both the partial sensing information and random selection information.

P-UE 1 1503 may perform the partial sensing at step S1560, and P-UE 2 1501 may perform the random selection at step S1570. By way of another example, P-UE 1 1503 may also perform the random selection at step S1560.

FIG. 16 is a diagram illustrating an exemplary method for determining a ratio of transmission resources of a P-UE according to an embodiment of the present invention.

In reference to FIG. 16, a base station may identify the information on presence/absence of receive capability of UEs and numbers of UEs with respective remaining power levels. The base station may select the UEs with absence of the receive capability and the UEs, although they have presence of the receive capability, with low remaining power levels as random selection-candidate UEs and select the UEs with presence of the receive capability and medium or high remaining power levels as partial sensing-candidate UEs. The base station may identify a number of random selection-candidate UEs and a number of partial sensing-candidate UEs and determine the ratio of resources based on the identified numbers.

In reference to FIG. 16, the number of random selection-candidate UEs is calculated by summing the number of the UEs with absence of the receive capability (4, 5, 3) and the number of the UEs, although they have presence of the receive capability, with low remaining power levels (2) as denoted by reference number 1610. The number of partial-sensing candidate UEs is calculated by summing the number of UEs with the receive capability and medium and high remaining power levels (5, 7) as denoted by reference number 1620. Accordingly, the base station allocates resources for use in the random selection scheme and the partial sensing scheme in the ratio of 14:12. In the drawing, it is assumed that the resources for use in the random selection scheme and partial sensing scheme are separated from each other.

Figure 17:
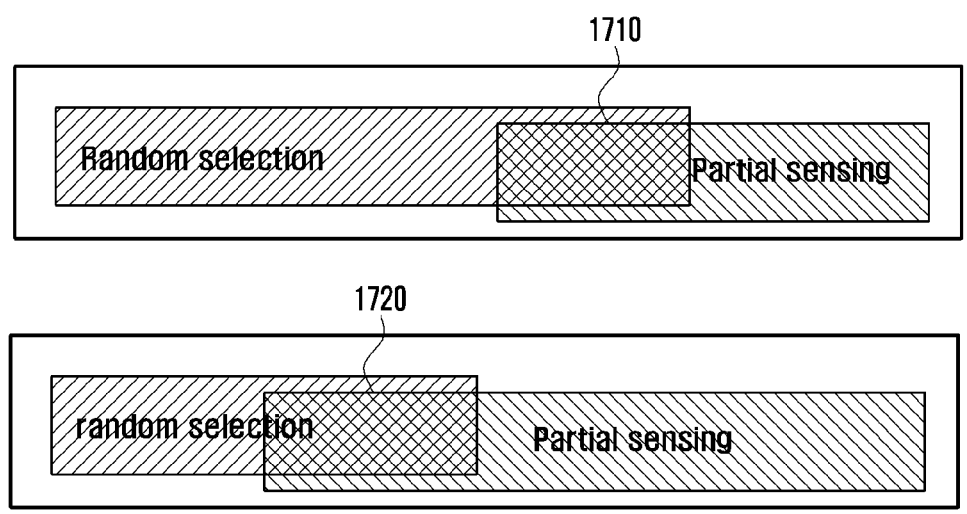
FIG. 17 is a diagram illustrating a method for determining transmit resources for a case where the transmit resources of a P-UE are overlapped according to an embodiment of the present invention.

FIG. 17 is a diagram illustrating a method for determining transmit resources for a case where the transmit resources of a P-UE are overlapped according to an embodiment of the present invention.

As in the embodiment of FIG. 17, it may be considered that the resources for use in the random selection scheme and the resources for use in the partial sensing scheme should be partially overlapped for a certain condition (e.g., large number of UEs).

The base station may calculate an overlapping section between the resources for use in the random selection scheme and the resources for use in the partial sensing scheme based on the ratio between the UEs with presence of the hardware receive function and the UEs with absence of the hardware receive function and remaining powers (or remaining power levels) of the UEs as described with reference to FIGS. 15 and 16. For example, assuming that the number of UEs for use of the random selection scheme is M, the number of UEs for use of the partial sensing scheme is N, and a number of resources is R, the overlapping section 1710 and 1720 may be M+N−R (if M+N>R).

Even if the resources for use in the random selection scheme and the resources for use in the partial sensing scheme are identical with each other, all of the above-described methods can be applied. The method of administrating the random selection resources for P-UEs and the partial sensing resources for P-UEs may be applied for administrating the random selection resources for P-UEs and sensing resources for V-UEs in the same manner. For various scenarios where the random selection resources and partial sensing resources for P-UEs and the sensing resources for V-UEs coexist (that are not overlapped, partially overlapped, identical with each other), it may also be possible to divide/manage the resources according to the aforementioned parameters such as numbers of resource-specific UEs, remaining power levels of the UEs, and remaining powers of the UEs.

In the case where the random selection resources for P-UEs, the partial sensing resources for P-UEs, and the sensing resources for V-UEs are overlapped, the P-UEs may be prioritized. In an embodiment, the P-UEs may be configured to use only the random selection scheme so as to be prioritized over the V-UEs. This is because the V-UEs transmit only when the resources are available after they have sensed the resources. Accordingly, if it is determined that there are a plurality of V-UEs while the P-UEs are using the random selection scheme or partial sensing scheme under the condition of absence of V-UE, the base station may transmit to the P-UEs operating in the partial sensing scheme a resource selection scheme switching indication message providing an instruction to use the random selection scheme. The P-UE operating in the partial sensing scheme may select resources via the random selection scheme according to the instruction from the base station and transmit data on the selected resources.

Although the above description is directed to the operation and procedure for the P-UE to select the transmit resources via the random selection scheme or the partial sensing scheme that is determined based on its receive hardware capability, remaining power amount, or remaining power level, it may also be possible to use a service priority of a V2X packet to be transmitted by the UE on the transmit resources as one of the criteria for determining the resource selection scheme. For example, if it is determined that the use of the random selection scheme is prioritized, a V2X packet with a high service priority may be transmitted in the random selection scheme. By way of another example, if it is determined that the use of the partial sensing scheme is prioritized, a V2X packet with a high service priority may be transmitted in the partial sensing scheme.

According to an embodiment of the present invention, the base station may determine one of the random selection scheme and partial sensing scheme for a P-UE based on any combination of a UE's receive hardware capability, a UE's remaining power amount or remaining power level, and a priority of the V2X packet, select a resource pool for use in the random selection scheme or a resource pool for use in the partial sensing scheme, and notify the UE of the selected resource pools.

According to an embodiment of the present invention, the base station may determine a resource selection scheme with the highest priority among the random selection scheme, partial sensing scheme, and sensing scheme and transmit determined resource selection priority information to the UE. The UE selects resources based on at least one of its hardware receive capability, its remaining power amount (or remaining power level), and priority of its V2X packet based on the resource selection priority information received from the base station and transmits data on the selected resources.

A description is made of the method for a UE registered with an adjacent operator (inter-PLMN) to receive a message transmitted by a V2X UE registered with a specific PLMN hereinafter.

Method 1) Assigning One PLMN to One Intelligent Transport System (ITS) Carrier

Figure 18:
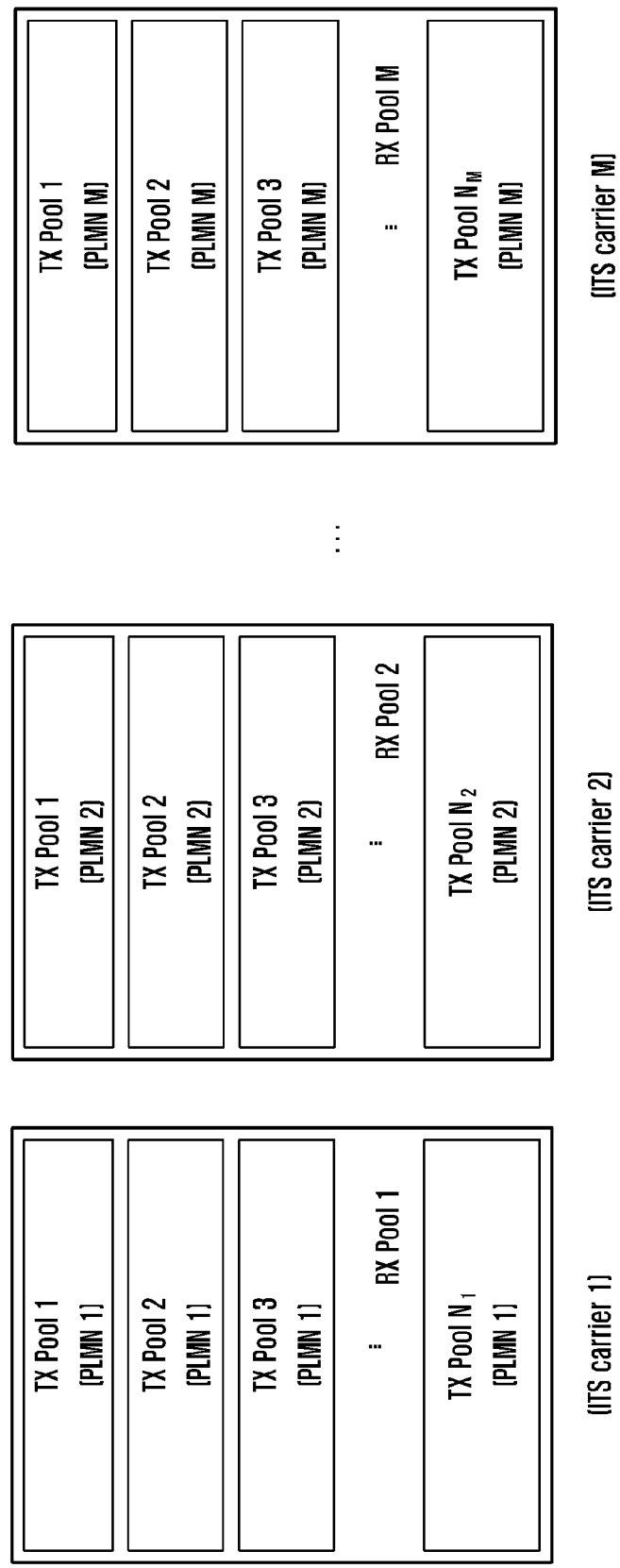
FIG. 18 is a diagram illustrating Method 1 for inter-operator communication according to an embodiment of the present invention.

FIG. 18 is a diagram illustrating Method 1 for inter-operator communication according to an embodiment of the present invention.

In reference to FIG. 18, each operator (PLMN) has an RX pool and one or more TX pools in its ITS carrier. The LX pool includes all TX pools. In this case, the operation procedure varies according to a hardware receive function (RF chain) of the UE.

If the UE has 1 receiver, it tunes the RF of its receiver to the ITS carriers in order to receive signals transmitted by the UEs registered with neighboring operators. If there are M different operators as shown in the exemplary case of FIG. 18, each operator may transmit a signal in a TX pool of its own ITS carrier. In this case, the UE may change the ITS carriers M times to receive messages transmitted by UEs registered with the respective PLMNs.

Otherwise, if the UE has multiple RF chains, it may simultaneously receive the messages transmitted from multiple PLMNs. Even in this case, if the number of RF chains of the UE is outnumbered by the number of PLMNs to cover, the UE has to make an RF tuning to some ITS carriers in order to receive signals via the corresponding RF chain as in the case where the UE has one RF chain. It may also be possible for the UE to monitor all of the neighboring PLMNs in such a way of receiving the messages transmitted from the PLMNs equal in number to the RF chains at one occasion and the messages transmitted from the remaining PLMNs equal in number to the RF chains at the next occasion.

Method 2) Assigning Multiple PLMNs to One ITS Carrier

Figure 19:
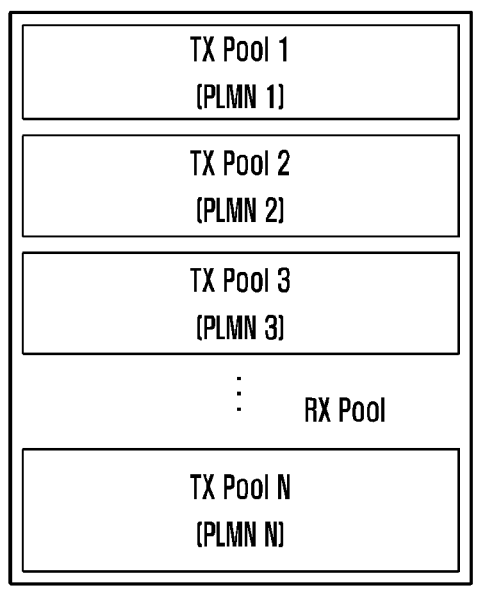
FIG. 19 is a diagram illustrating Method 2 for inter-operator communication according to an embodiment of the present invention.

FIG. 19 is a diagram illustrating Method 2 for inter-operator communication according to an embodiment of the present invention.

In reference to FIG. 19, an ITS carrier may be configured to have resources for use by multiple PLMNs. The PLMNs may have respective TX pools and a common RX pool. Accordingly, the UE may receive messages transmitted from the multiple PLMNs in the corresponding ITS carrier using one RF chain.

In order to accomplish this, a base station of a PLMN has to receive information on the TX pools assigned for the neighboring PLMNs from the respective neighboring PLMNs. The information on the TX pools of the neighboring PLMNs may be preconfigured on the UE or transmitted by the base station of the PLMN which is serving the UE via dedicated signaling or broadcasting when the UE attaches to the base station of the PLMN.

Figure 20:
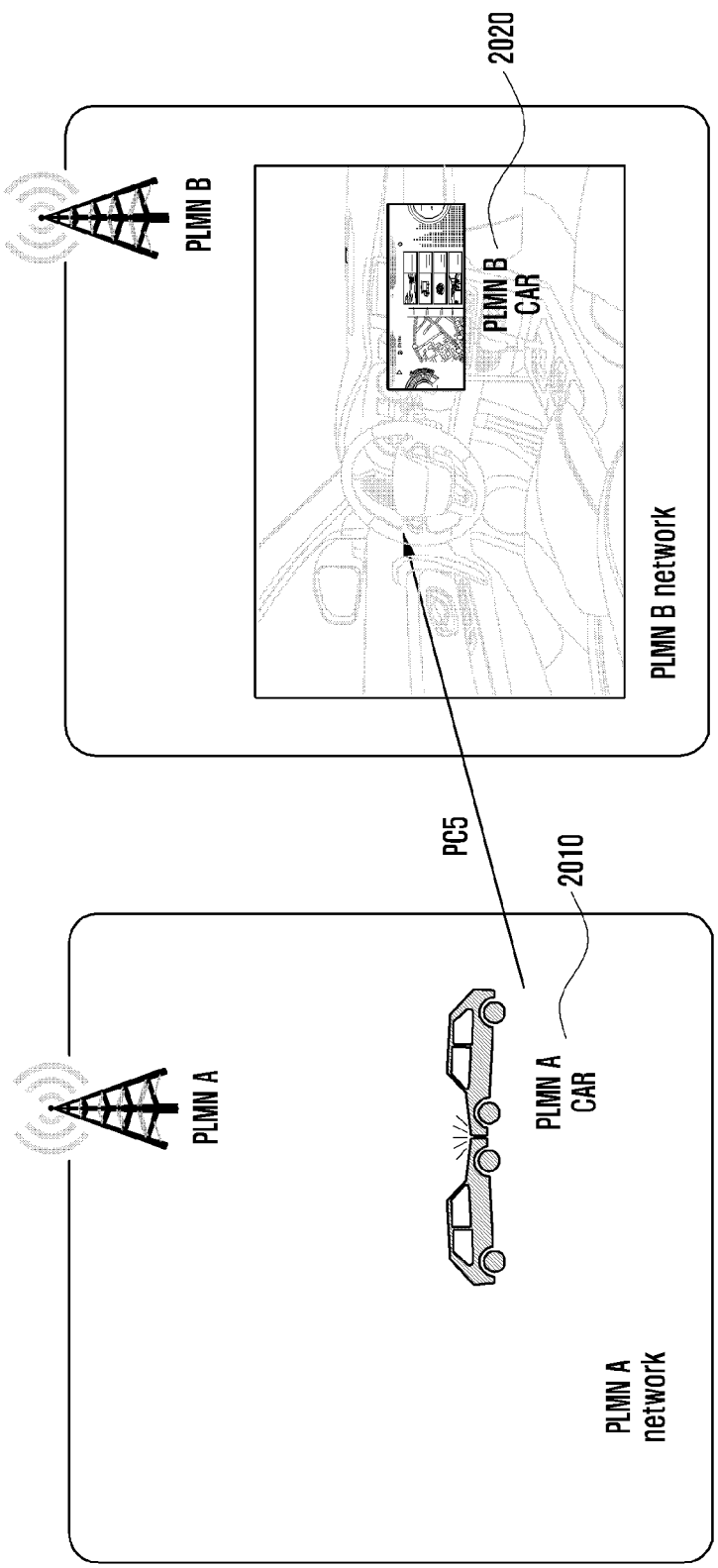
FIG. 20 is a diagram illustrating a scenario of inter-operator communication according to an embodiment of the present invention.

FIG. 20 is a diagram illustrating a scenario of inter-operator communication according to an embodiment of the present invention.

In the scenario depicted in FIG. 20, a PLMN A CAR 2010 transmits to a PLMN B CAR 2020 an event indicating that an accident has occurred. In order for a UE being served by a PLMN to transmit a signal to another UE registered with a different PLMN as in the scenario depicted in FIG. 20, there is a need of a proper carrier and resource configuration as in Method 1 or 2 described above or Method 3 to be described with reference to FIG. 21.

Figure 21:
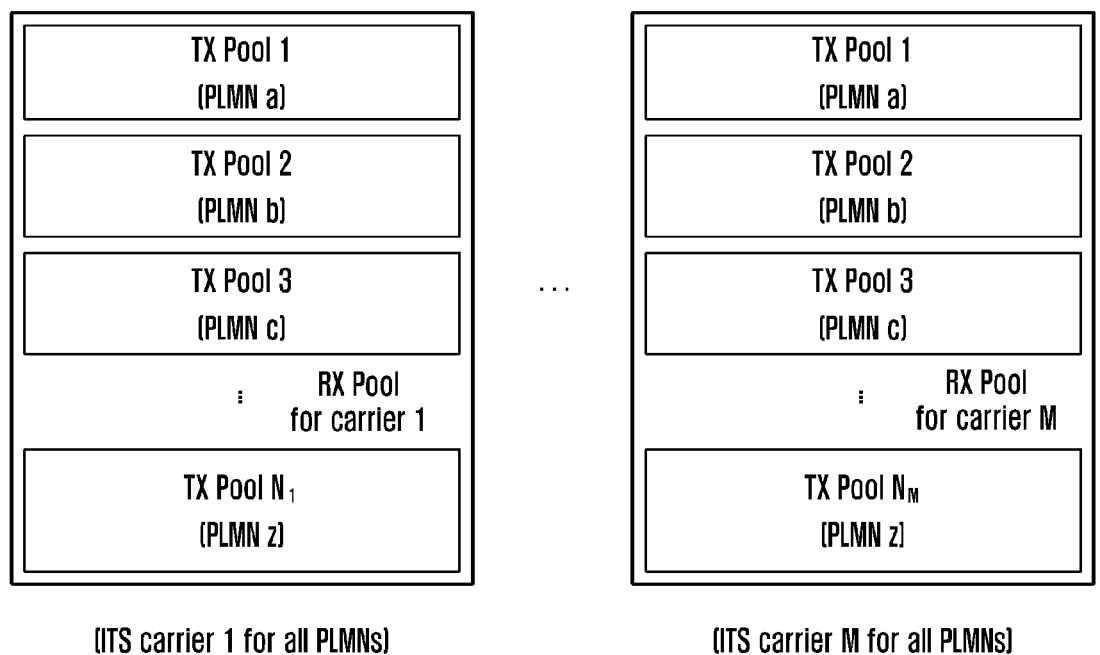
FIG. 21 is a diagram illustrating Method 3 for inter-operator communication according to an embodiment of the present invention.

FIG. 21 is a diagram illustrating Method 3 for inter-operator communication according to an embodiment of the present invention.

In reference to FIG. 21, there are multiple ITS carriers, and each ITS carrier includes resources of multiple operators. The resources of the multiple operators are not overlapped. The resources of each operator may exist in one or more ITS carriers. For this purpose, the serving base station of a operator should have information on operator-specific TX pools for V2X. The information on the TX pools of the neighboring operators may be received over inter-operator interfaces among the base stations of the respective operators or preconfigured.

FIG. 22 is a signal flow diagram illustrating a procedure for a serving base station to transmit information on resources of neighboring operators to a UE according to an embodiment of the present invention.

In reference to FIG. 22, the information on the TX pools of neighboring operators may be received from the serving base station of its home PLMN when it attaches to the base station, the TX pool information being transmitted via broadcasting (a) or dedicated signaling (b).

In reference to part (a) of FIG. 22, a base station supporting V2X communication may transmit the information necessary for the V2X communication using a system information block (SIB) as denoted by reference number 2210 (in an embodiment of the present invention, it is assumed that the information necessary for the V2X communication is carried in SIB 21).

In reference to part (b) of FIG. 22, a base station supporting the V2X communication may transmit the information necessary for the V2X communication using an RRC connection reconfiguration signal that is transmitted in a RRC connection setup procedure between the base station and an UE supporting the V2X communication as denoted by reference number 2220. By way of another example, it may be possible to use the RRC connection reconfiguration signal being exchanged after the RRC connection setup.

According to an embodiment of the present invention, the broadcast signaling or dedicated signal may include information on a V2X carrier for use in V2X communication between the operator of the serving base station and neighboring operators and information on TX and RX resources for V2X communication in the V2X carrier.

By way of example, the information on the V2X TX and RX resources of the home and other PLMNs that is included in the broadcast signal or dedicated signal may be expressed as follows.

Figure 23A:
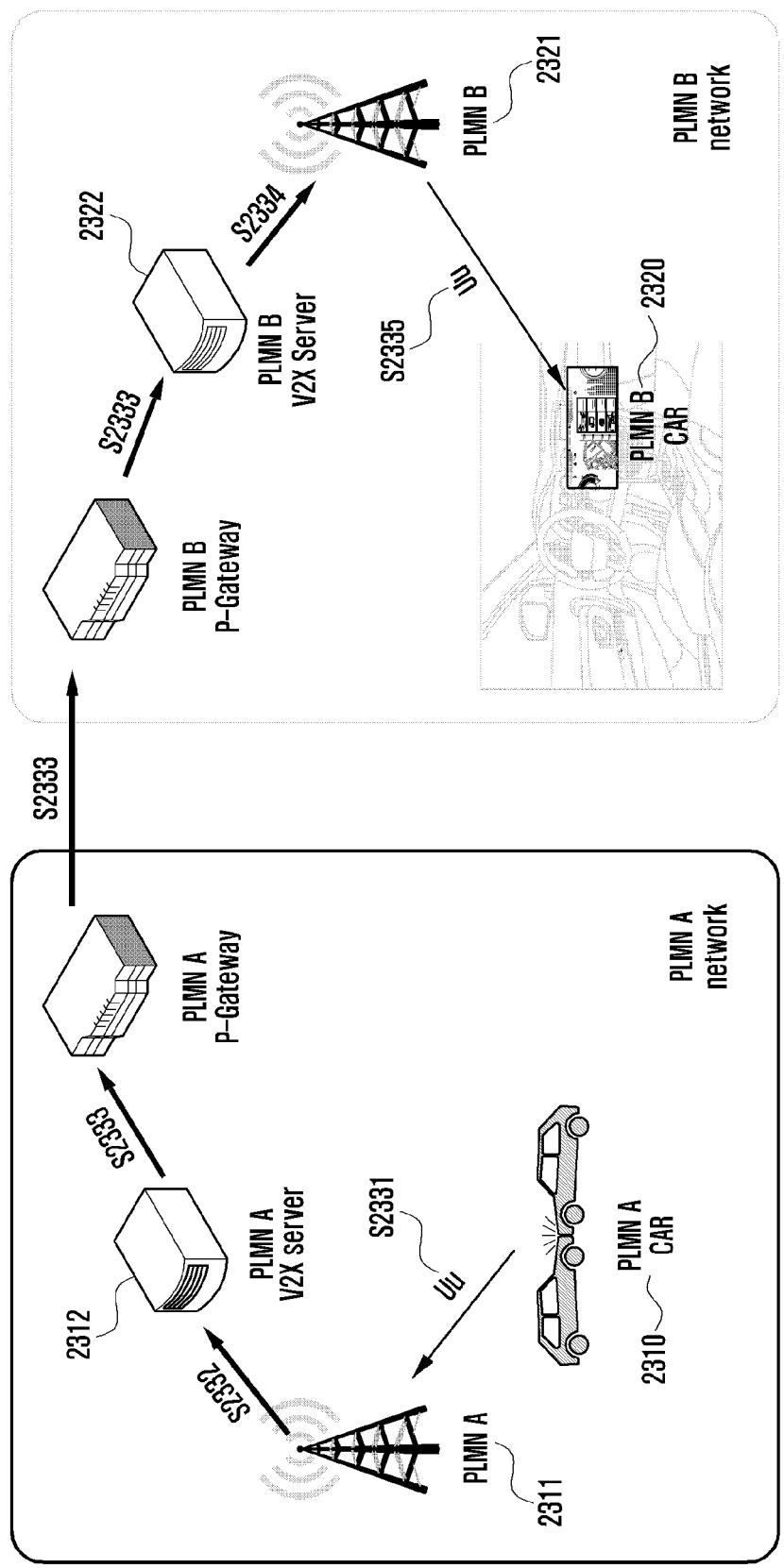
FIG. 23A is a diagram illustrating a method for V2X communication between UEs registered with different operators according to an embodiment of the present invention.

(V2X carrier and TX/RX resources for all operators)
1) V2X carrier for all operators (home and other operators, information on multiple carriers)
   TX resource information
   RX resource information
(V2X carrier and TX/RX resources for other operators, V2X carrier and TX/RX resources for home operator)
1) V2X carriers for other operators (other operators, information on multiple carriers)
   TX resource information
   RX resource information
2) V2X carrier for serving cell's PLMN (home operator, information on multiple carriers)
   TX & RX resource information FIG. 23A is a diagram illustrating a method for V2X communication between UEs registered with different operators according to an embodiment of the present invention.

FIG. 23A shows a method for receiving a V2X signal from a UE registered with a neighboring operator through a Uu link as an interface between a base station and a UE. In reference to FIG. 23A, it may be possible establish a connection between UEs registered with different operators of which base stations are connected with the respective UEs via the Uu interface.

In reference to FIG. 23A, one of the two V2X UEs is a car UE 2310 registered with operator A (PLMN A CAR) and the other is a car UE 2320 registered with operator B (PLMN B CAR).

The drawing depicts a scenario where a PLMN A CAR reports an accident that occurred around it. If an accident occurs around the PLMN A CAR, the PLMN A CAR may transmit a V2X message to a base station 2311 via the Uu interface at step S2331 to report that an accident has occurred, and the base station may relay the V2X message to a server 2312 at step S2332. The V2X message my include information on the current location of the PLMN A CAR.

The V2X server 2312 of operator A may relay the message to a V2X server 2322 of another operator (operator B in the drawing) at step S2333. The V2X server 2312 may transmit the message reporting that the accident has occurred to the V2X server 2322 of operator B via a gateway of operator A and a gateway of operator B.

Upon receipt of the V2X message from the operator A, the V2X server 2322 of operator B check the V2X message for the location information. At step S2334, the V2X server 2322 of operator B transmits the message to a base station 2321 located around the location in the V2X message. In the disclosure it is assumed that the V2X server has the location information of the base station.

At step 2335, the base station 2321 that provides the V2X service of operator B may transmit the V2X signaling from operator A to a V2X UE being served by operator B as its home operator. Although the description has been made with specific terms such as operator A and operator B in this embodiment, the present invention is not limited by the terms, and the description may be made with terms such as first operator and second operator.

Figure 23B:
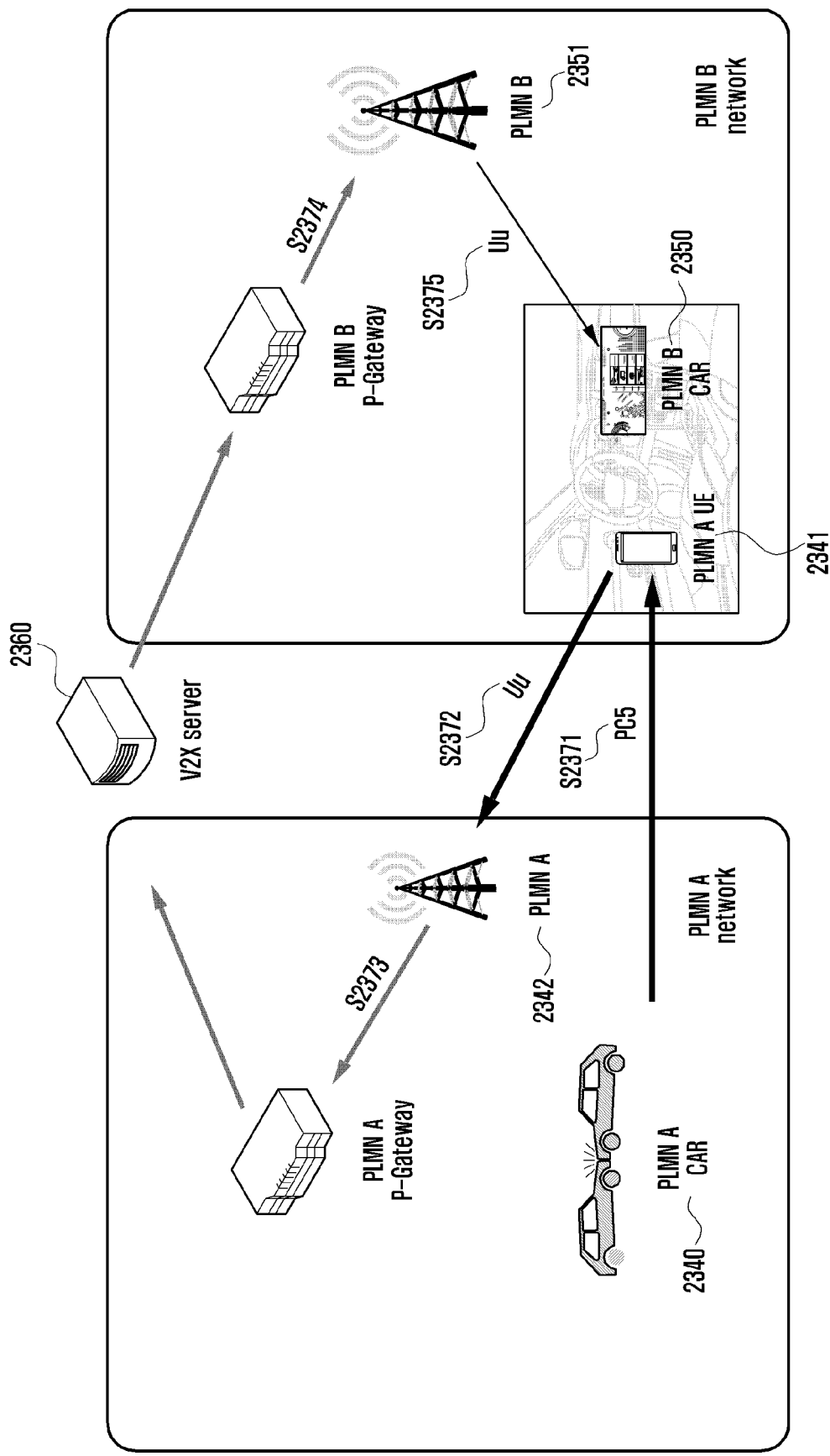
FIG. 23B is a diagram illustrating a method for V2X communication between UEs registered with different operators according to another embodiment of the present invention.

FIG. 23B is a diagram illustrating a method for V2X communication between UEs registered with different operators according to another embodiment of the present invention.

FIG. 23B shows a method for inter-operator V2X communication in the situation where there is a car UE registered with operator A (PLMN A CAR) 2340, a UE registered with operator A (PLMN A UE) 2341, and a car UE registered with operator B (PLMN B CAR) 2350.

Although this embodiment is directed to the case where a V2X server is located outside the operators, the scope of the present invention is not limited thereto. The V2X server 2360 stores information on the relationship between the PLMN A UE 2341 and the PLMN B CAR 2350. The relationship information indicates that one user owns the two UEs so as to receive a service via one of the UEs and consumes the service with both the UEs.

In the case where the PLMN A UE connects to a network, the PLMN A UE transmits information on its relationship with the PLMN B CAR to the V2X server.

In reference to FIG. 23B, the PLMN A CAR may transmit a V2X message to the PLMN A UE via a PC5 interface at step S2371 to report that an accident has occurred around it.

The PLMN A UE may relay the received message to a base station 2342 of PLMN A via a Uu interface at step S2372. The base station 2342 transmits the message to the V2X server 2360 via a gateway at step S2373.

The server 2360 checks the relationship information of the UE for the related UE and transmits data to the related UE. In reference to FIG. 23B, if V2X data are received from the PLMN A UE 2341, the V2X server 2360 transmits the V2X data to the PLMN B CAR based on the relation information between the PLMN B CAR and PLMN A UE.

Figure 24:
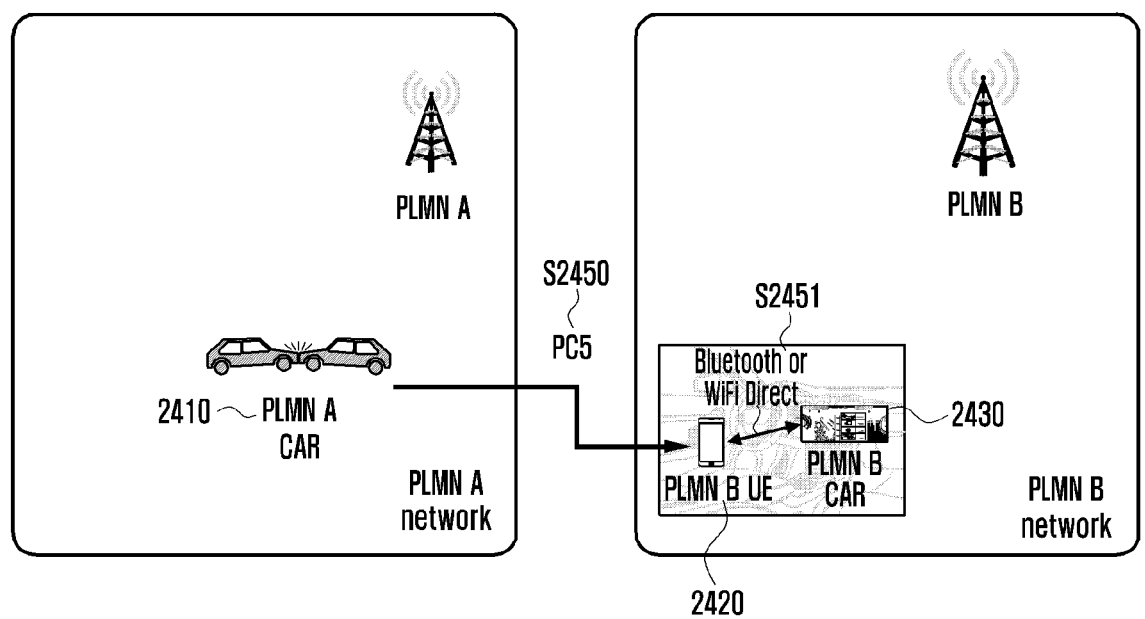
FIG. 24 is a diagram illustrating a method for V2X communication between UEs registered with different operators via a short range communication according to an embodiment of the present invention.

FIG. 24 is a diagram illustrating a method for V2X communication between UEs registered with different operators via a short range communication according to an embodiment of the present invention.

In reference to FIG. 24, there may be a car UE registered with operator A (PLMN A) (PLMN A CAR) 2410, a UE registered with operator A (PLMN A UE) 2420, and a car UE registered with operator B (PLMN B) (PLMN B CAR) 2430.

If the PLMN A UE 2420 is located in a vehicle, it may be connected with the PLMN B CAR 2430 via a short range communication network. For example, the PLMN A UE 2420 and the PLMN B CAR 2430 may be connected with each other through a short range communication link such as a Bluetooth link and a Wi-Fi link. Descriptions of conditions for triggering a short range communication link establishment, when the PLMN A UE 2420 is located in the PLMN B CAR 2430, between the PLMN A UE and the PLMN B CAR are omitted because they are out of the scope of the present invention.

If the PLMN A CAR 2410 detects an accident that has occurred around it, it may transmit a V2X message to the PLMN A UE 2420 via a PC5 or Uu link at step S2450 to report the accident.

The PLMN A UE 2420 may transmit the V2X message to the PLMN B CAR 2430 via the short range communication link at step S2451. The PLMN B CAR 2430 may transmit the V2X message to a PLMN B UE via a PLMN B V2X communication system. The PLMN B CAR may control the vehicle based on the received V2X message.

Figure 25:
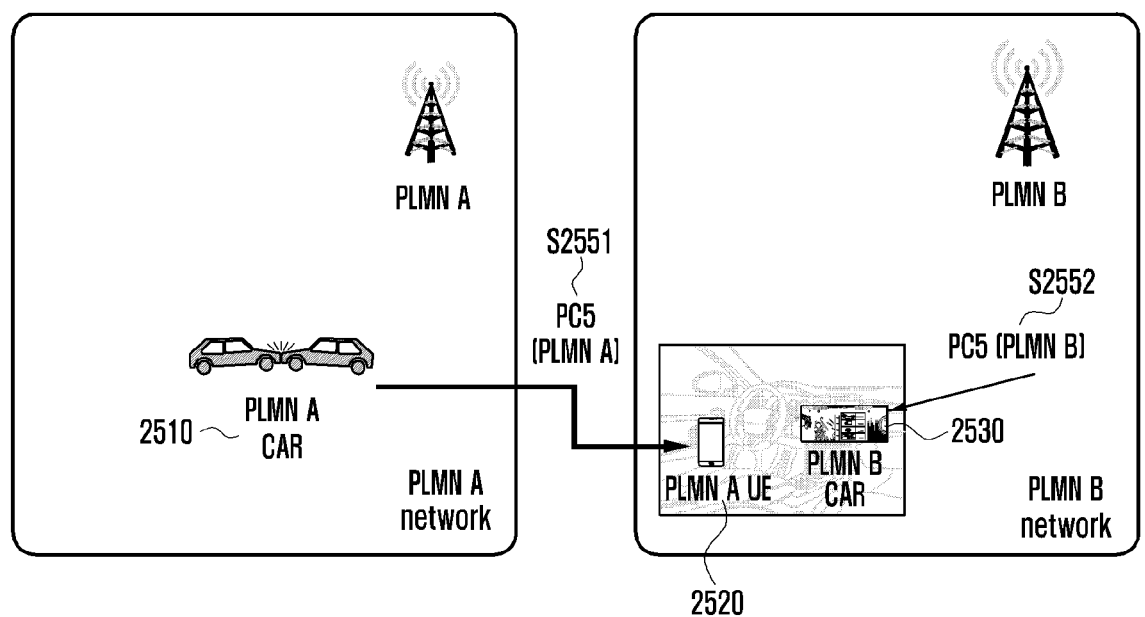
FIG. 25 is a diagram illustrating a method for V2X communication between UEs registered with different operators according to another embodiment of the present invention.

FIG. 25 is a diagram illustrating a method for V2X communication between UEs registered with different operators according to another embodiment of the present invention.

In reference to FIG. 25, there are V2X UEs that are registered with either PLMN A or PLMN B in a vehicle. The UE registered with operator A (PLMN A UE) that has subscribed to the V2X service via operator A and the car UE registered with operator B (PLMN B CAR) that has subscribed to the V2X service via operator B may be owned by one user; in this case, information on the relationship between the two UEs may be stored in a subscriber information server (or V2X server). The relationship information indicates that one user owns the two UEs so as to receive a service via one of the UEs and consumes the service with both the UEs.

In the case where the PLMN A UE 2520 and the PLMN B CAR 2530 are located in the same vehicle, the PLMN A UE may transmit information indicating that the PLMN A UE and the PLMN B CAR are located in the same vehicle and related to each other to the subscriber information server (or V2X server) via a base station.

In an embodiment, the V2X service may be provided to the PLMN A UE 2530 via the PLMN B CAR. If a V2X service message received from the base station includes information on PLMN A, the PLMN B CAR 2530 may transmit the V2X service information of PLMN A to the PLMN A UE 2520. The PLMN A UE may transmit the V2X service information to another V2X UE via the PLMN A system.

In another embodiment, the PLMNs may provide the V2X service to V2X UEs registered with the respective PLMNs. The V2X UE registered with PLMN A receives a V2X message of PLMN A and transmits received information to the corresponding vehicle. The V2X UE registered with PLMN B receives a V2X message of PLMN B and transmits received information to the corresponding vehicle. The information generated by the vehicle may be transmitted to the PLMN A system via the V2X UE registered with PLMN A. The information generated by the vehicle may be transmitted to the PLMN B system via the V2X UE registered with PLMN B.

Hereinafter, descriptions are made of the operations and procedure of a UE when shared scheduling-based and sensing-based V2X resources become unshared.

Figure 26:
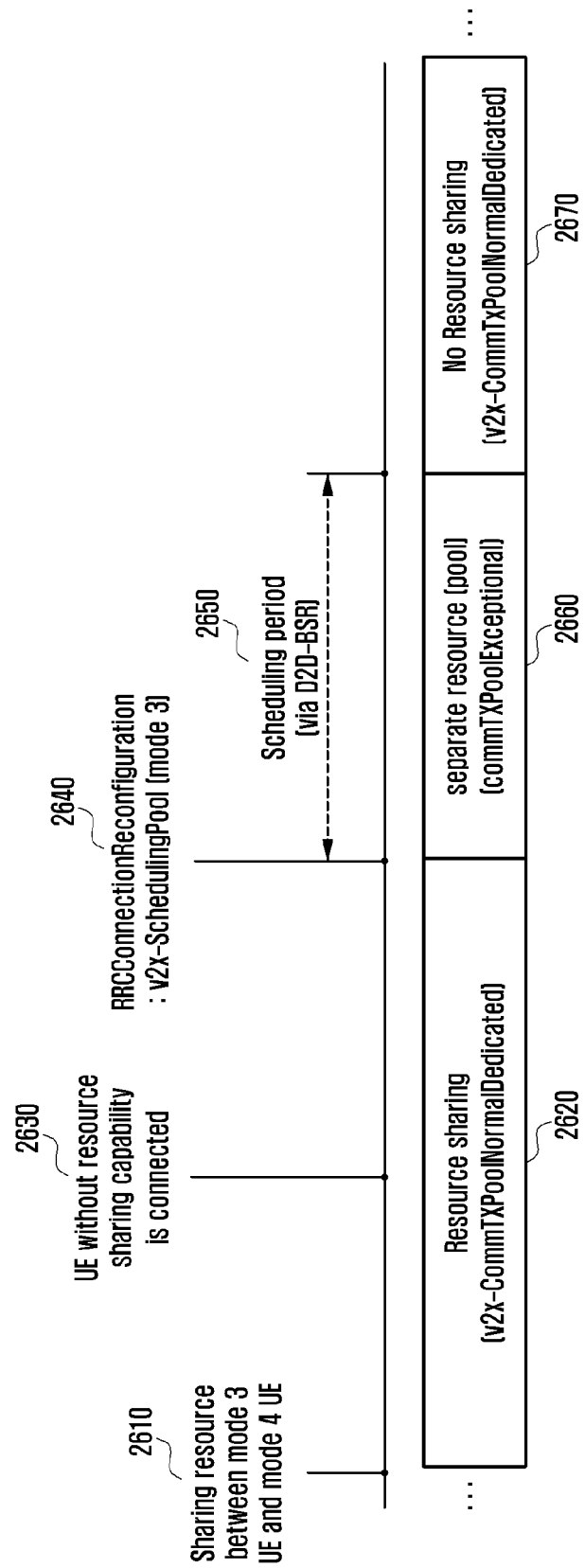
FIG. 26 is a diagram illustrating an operation of a UE connected to a network (RRC_Connected UE) in reconfiguring scheduling-based resources among V2X resources according to an embodiment of the present invention.

FIG. 26 is a diagram illustrating an operation of a UE connected to a network (RRC_Connected UE) in reconfiguring scheduling-based resources among V2X resources according to an embodiment of the present invention.

In FIG. 26, the scheduling-based resources and the sensing-based resources for the RRC_Connected UE may already be shared 2610. In this case, a base station may transmit information on the sharing of the scheduling-based resources and the sensing-based resources 2620 to the UE in the form of a message. In the case of LTE, the message may be v2x-CommTXPoolNormalDedicated.

Afterward, if a V2X UE that cannot share the scheduling-based resources and the sensing-based resources is connected to the base station as denoted by reference number 2630, the base station may make a change such that the scheduling-based resources and the sensing-based resources are not shared and notifies the UE of the change in the form of a message as denoted by reference number 2640. In the case of LTE, the change notification message may be v2x-CommTXPoolNormalDedicated or v2x-schedulingPool included in an RRC Connection Reconfiguration message.

In this embodiment, if the UE receives information indicative of non-sharing of the scheduling-based resources and sensing-based resources from the base station in the state that it has already received information indicative of the sharing of the scheduling-based resources and sensing-based resources from the base station as denoted by reference number 2640, the UE may transmit a resource request message (D2D-BSR) requesting to the base station for scheduling resources for V2X communication as denoted by reference number 2650.

In this embodiment, the UE transmits the V2X message on separate resources 2660 without waiting data transmission during the scheduling period before receiving resource information from the base station. For example, the information on the separate resources 2660 may be carried by a message called commTXPoolExceptional in LTE. The base station may transmit the information on the separate resources to the UE via a broadcast message or a message addressed to the UE. If the information on the separate resources is carried in both the broadcast message and message addressed to the UE, the UE may select one of the two messages and transmit a V2X message on the separate resources indicated by the selected message. Upon receipt of the resource information via the D2D-BSR, the UE transmits the V2X message on the resources 2670 indicated by the resources information.

Figure 27:
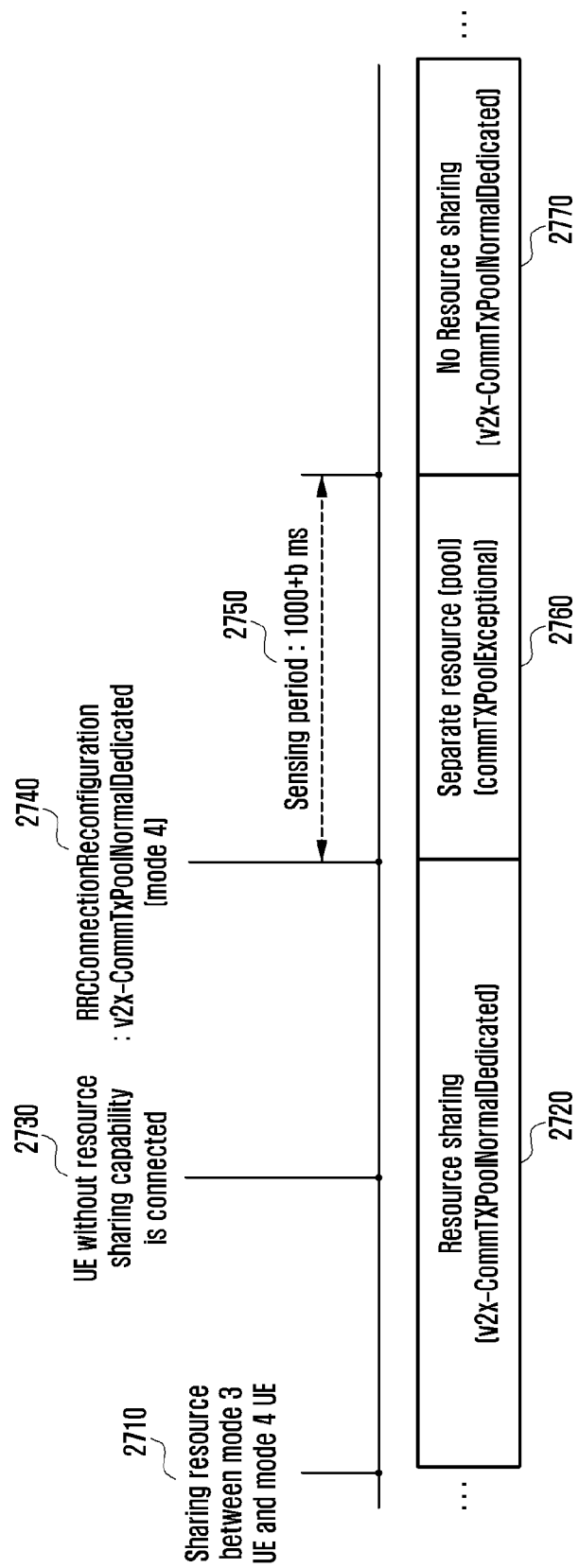
FIG. 27 is a diagram illustrating an operation of a UE connected to a network (RRC_Connected UE) in reconfiguring sensing-based resources among V2X resources according to an embodiment of the present invention.

FIG. 27 is a diagram illustrating an operation of a UE connected to a network (RRC_Connected UE) in reconfiguring sensing-based resources among V2X resources according to a sixth embodiment of the present invention.

In reference to FIG. 27, the scheduling-based resources and the sensing-based resources for the RRC_Connected UE may already be shared 2710. In this case, a base station may transmit information on the sharing of the scheduling-based resources and the sensing-based resources 2720 to the UE in the form of a message. In the case of LTE, the message may be v2x-CommTXPool Normal Dedicated.

Afterward, if a V2X UE that cannot share the scheduling-based resources and the sensing-based resources is connected to the base station as denoted by reference number 2730, the base station may make a change such that the scheduling-based resources and the sensing-based resources are not shared and notifies the UE of the change in the form of a message as denoted by reference number 2740. In the case of LTE, the change notification message may be v2x-CommTXPoolNormalDedicated included in a message called RRC Connection Reconfiguration.

In this embodiment, if the UE receives information indicative of non-sharing of the scheduling-based resources and sensing-based resources from the base station in the state that it has already received information indicative of the sharing of the scheduling-based resources and sensing-based resources from the base station as denoted by reference number 2740, the UE senses the sensing-based resources during a sensing period (e.g., 1000+b ms) 2750 to transmit a V2X message.

In this embodiment, the UE transmits the V2X message on separate resources 2760 without waiting until it becomes possible to transmit data on the sensed resources. For example, the information on the separate resources 2760 may be carried by a message called commTXPoolExceptional in LTE. The base station may transmit the information on the separate resources to the UE via a broadcast message or a message addressed to the UE. If the information on the separate resources is carried in both the broadcast message and message addressed to the UE, the UE may select one of the two messages and transmit a V2X message on the separate resources indicated by the selected message. Afterward, the UE transmits the V2X message on the sensed resources 2770.

Figure 28:
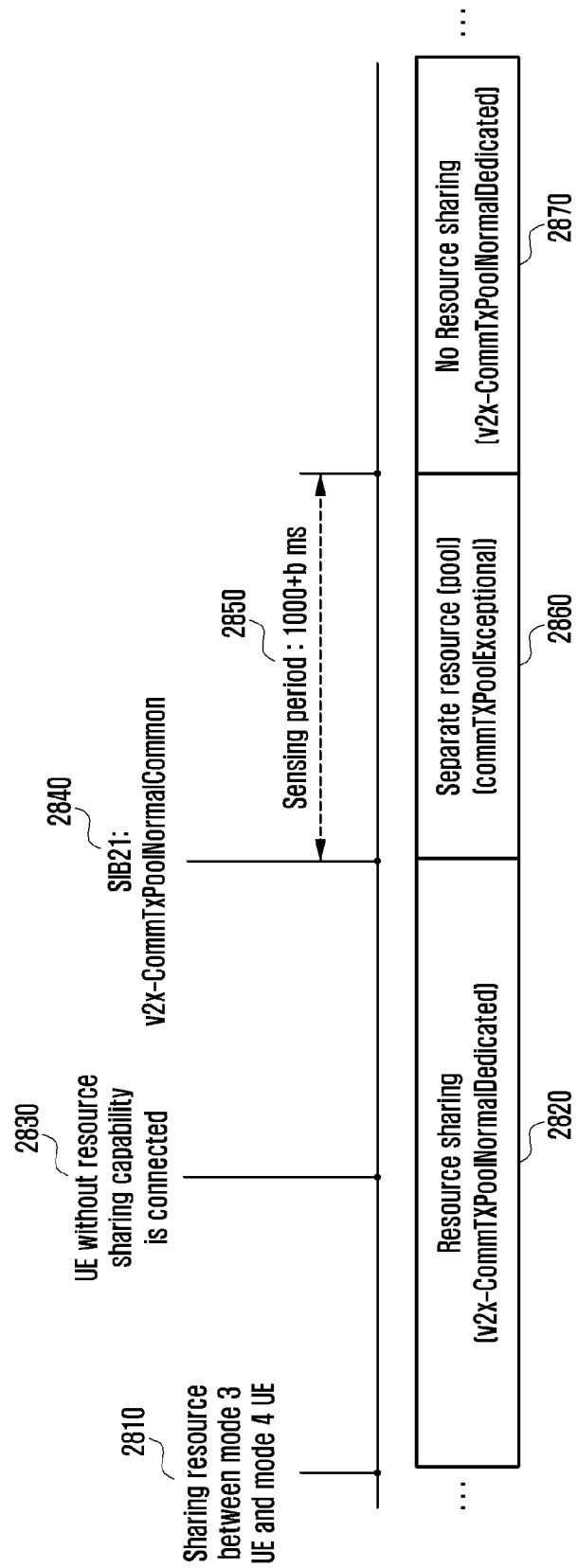
FIG. 28 is a diagram illustrating an operation of a UE not connected to a network (RRC_Idle UE) in reconfiguring sensing-based resources among V2X resources according to an embodiment of the present invention.

FIG. 28 is a diagram illustrating an operation of a UE not connected to a network (RRC_Idle UE) in reconfiguring sensing-based resources among V2X resources according to a sixth embodiment of the present invention.

In FIG. 28, the scheduling-based resources and the sensing-based resources for the RRC_Idle UE may already be shared 2810. In this case, a base station may transmit information on the sharing of the scheduling-based resources and the sensing-based resources 2820 to the UE in the form of a message. In the case of LTE, the message may be v2x-CommTXPoolNormalCommon.

Afterward, if a V2X UE that cannot share the scheduling-based resources and the sensing-based resources is connected to the base station as denoted by reference number 2830, the base station may make a change such that the scheduling-based resources and the sensing-based resources are not shared and notifies the UE of the change in the form of a message as denoted by reference number 2840. In the case of LTE, the change notification message may be v2x-CommTXPoolNormalCommon in system information block (SIB) 21.

In the present invention, if the UE receives information indicative of non-sharing of the scheduling-based resources and sensing-based resources from the base station in the state that it has already received information indicative of the sharing of the scheduling-based resources and sensing-based resources from the base station as denoted by reference number 2840, the UE senses the sensing-based resources during a sensing period (e.g., 1000+b ms) 2850 to transmit a V2X message.

In this embodiment, the UE transmits the V2X message on separate resources 2860 without waiting until it becomes possible to transmit data on the sensed resources. For example, the information on the separate resources 2860 may be carried by a message called commTXPoolExceptional in LTE. The base station may transmit the information on the separate resources to the UE via a broadcast message. Afterward, the UE transmits the V2X message on the sensed resources 2870.

Hereinafter, descriptions a made of the operations and procedure of a UE when unshared scheduling-based and sensing-based V2X resources become shared.

Figure 29:
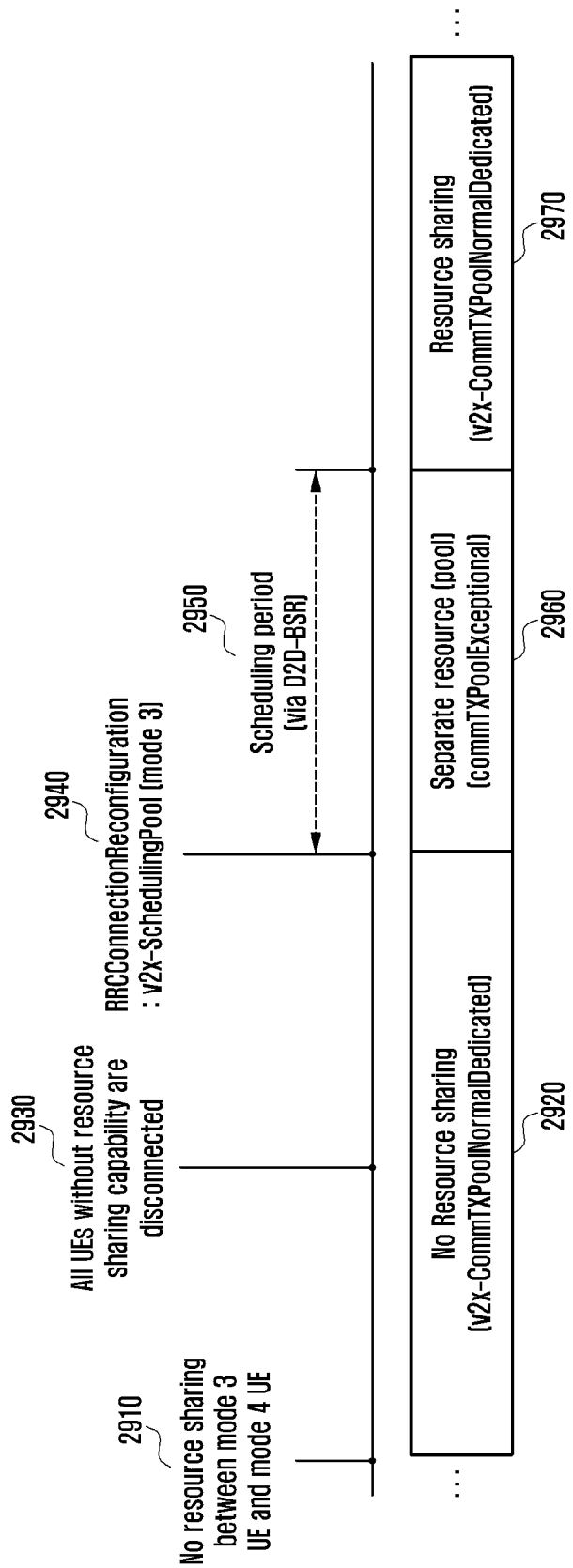
FIG. 29 is a diagram illustrating an operation of a UE connected to a network (RRC_Connected UE) in reconfiguring scheduling-based resources among V2X resources according to an embodiment of the present invention.

FIG. 29 is a diagram illustrating an operation of a UE connected to a network (RRC_Connected UE) in reconfiguring scheduling-based resources among V2X resources according to a sixth embodiment of the present invention.

In reference to FIG. 29, the scheduling-based resources and the sensing-based resources for the RRC_Connected UE may not be shared 2910. In this case, a base station may transmit information on the non-sharing of the scheduling-based resources and the sensing-based resources 2920 to the UE in the form of a message. In the case of LTE, the message may be v2x-CommTXPoolNormalDedicated.

Afterward, if all V2X UEs (Rel-14 UEs) that cannot share the scheduling-based resources and the sensing-based resources are all disconnected from the base station as denoted by reference number 2930, the base station may make a change such that the scheduling-based resources and the sensing-based resources are shared and notifies the UE of the change in the form of a message as denoted by reference number 2940. In the present invention, all of the V2X UEs that cannot share the scheduling-based and sensing-based resources may be disconnected from the base station at one time or one by one until finally there are no V2X UEs remaining connected to the base station, which cannot share the scheduling-based and sensing-based resources.

The message carrying the information on the sharing of the scheduling-based and the sensing-based resources may be a v2x-CommTXPoolNormalDedicated or v2x-schedulingPool in an RRC Connection Reconfiguration message in LTE.

In this embodiment, if the UE receives information indicative of sharing of the scheduling-based resources and sensing-based resources from the base station in the state that it has already received information indicative of the non-sharing of the scheduling-based resources and sensing-based resources from the base station as denoted by reference number 2940, the UE may transmit a resource request message (D2D-BSR) requesting to the base station for scheduling resources for V2X communication as denoted by reference number 2950.

In this embodiment, the UE transmits the V2X message on separate resources 2960 without waiting data transmission during the scheduling period before receiving resource information from the base station. For example, the information on the separate resources 2960 may be carried by a message called commTXPoolExceptional in LTE. The base station may transmit the information on the separate resources to the UE via a broadcast message or a message addressed to the UE. If the information on the separate resources is carried in both the broadcast message and message addressed to the UE, the UE may select one of the two messages and transmit a V2X message on the separate resources indicated by the selected message. Upon receipt of the resource information via the D2D-BSR, the UE transmits the V2X message on the resources 2970 indicated by the resources information.

Figure 30:
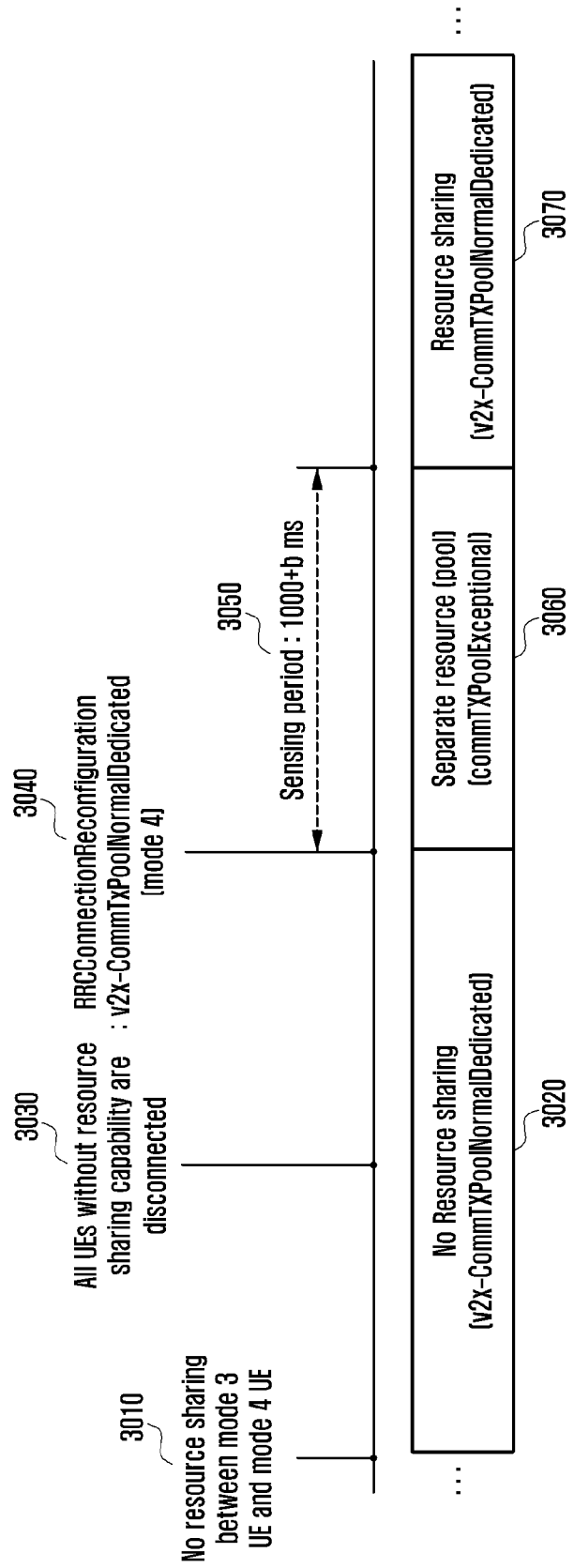
FIG. 30 is a diagram illustrating an operation of a UE connected to a network (RRC_Connected UE) in reconfiguring sensing-based resources among V2X resources according to an embodiment of the present invention.

FIG. 30 is a diagram illustrating an operation of a UE connected to a network (RRC_Connected UE) in reconfiguring sensing-based resources among V2X resources according to a sixth embodiment of the present invention.

In reference to FIG. 30, the scheduling-based resources and the sensing-based resources for the RRC_Connected UE may not be shared 3010. In this case, a base station may transmit information on the non-sharing of the scheduling-based resources and the sensing-based resources 3020 to the UE in the form of a message. In the case of LTE, the message may be v2x-CommTXPoolNormalDedicated.

Afterward, if all V2X UEs that cannot share the scheduling-based resources and the sensing-based resources are all disconnected from the base station as denoted by reference number 3030, the base station may make a change such that the scheduling-based resources and the sensing-based resources are shared and notifies the UE of the change in the form of a message as denoted by reference number 3040. In the present invention, all of the V2X UEs that cannot share the scheduling-based and sensing-based resources may be disconnected from the base station at one time or one by one until finally there are no V2X UEs remaining connected to the base station, which cannot share the scheduling-based and sensing-based resources.

The message carrying the information on the sharing of the scheduling-based and the sensing-based resources may be a v2x-CommTXPoolNormalDedicated in an RRC Connection Reconfiguration message in LTE.

In this embodiment, if the UE receives information indicative of sharing of the scheduling-based resources and sensing-based resources from the base station in the state that it has already received information indicative of the non-sharing of the scheduling-based resources and sensing-based resources from the base station as denoted by reference number 3040, the UE senses the sensing-based resources during a sensing period (e.g., 1000+b ms) 3050 by way of example to transmit a V2X message.

In this embodiment, the UE transmits the V2X message on separate resources 3060 without waiting until it becomes possible to transmit data on the sensed resources. For example, the information on the separate resources 3060 may be carried by a message called commTXPoolExceptional in LTE. The base station may transmit the information on the separate resources to the UE via a broadcast message or a message addressed to the UE. If the information on the separate resources is carried in both the broadcast message and a message addressed to the UE, the UE may select one of the two messages and transmit a V2X message on the separate resources indicated by the selected message. Afterward, the UE transmits the V2X message on the sensed resources 3070.

Figure 31:
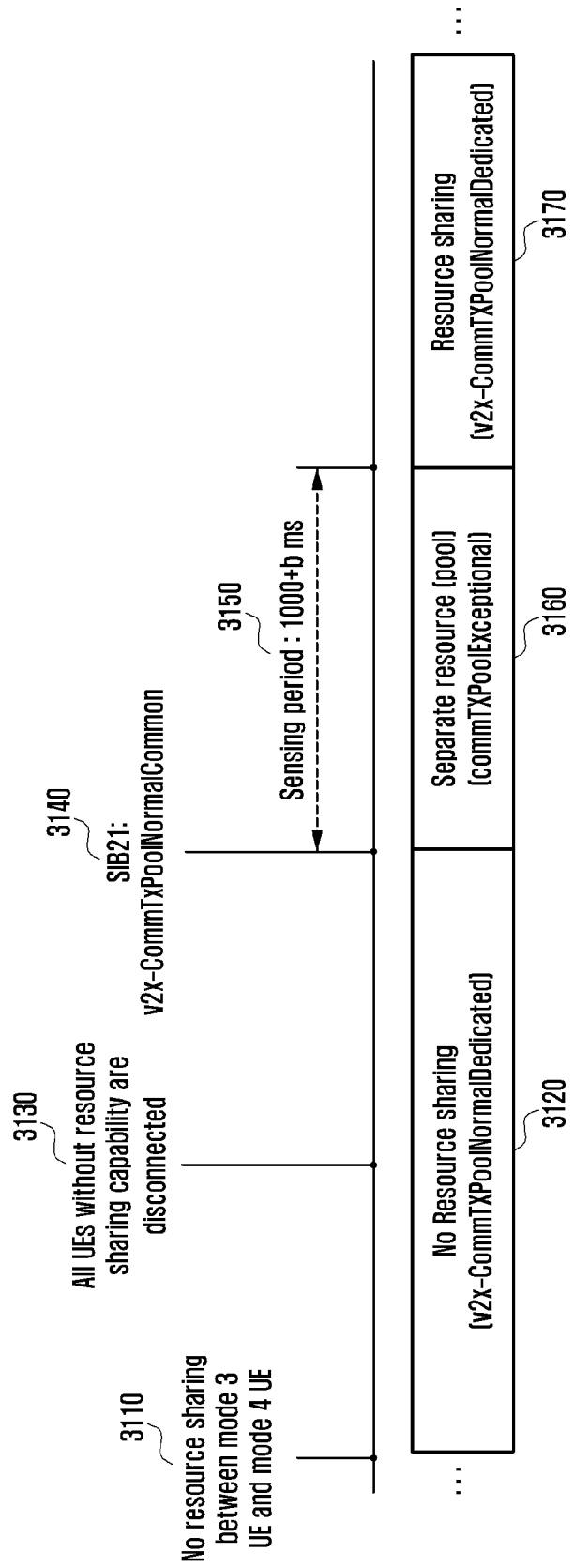
FIG. 31 is a diagram illustrating an operation of a UE not connected to a network (RRC_Idle UE) in reconfiguring sensing-based resources among V2X resources according to an embodiment of the present invention.

FIG. 31 is a diagram illustrating an operation of a UE not connected to a network (RRC_Idle UE) in reconfiguring sensing-based resources among V2X resources according to a sixth embodiment of the present invention.

In FIG. 31, the scheduling-based resources and the sensing-based resources for the RRC_Idle UE may not be shared 3110. In this case, a base station may transmit information on the non-sharing of the scheduling-based resources and the sensing-based resources 3120 to the UE in the form of a message. In the case of LTE, the message may be v2x-CommTXPoolNormalCommon.

Afterward, if all V2X UEs (Rel_14 UEs) that cannot share the scheduling-based resources and the sensing-based resources are all disconnected from the base station as denoted by reference number 3130, the base station may make a change such that the scheduling-based resources and the sensing-based resources are shared and notifies the UE of the change in the form of a message as denoted by reference number 3140. In the present invention, all of the V2X UEs that cannot share the scheduling-based and sensing-based resources may be disconnected from the base station at one time or one by one until finally there are no V2X UEs remaining connected to the base station, which cannot share the scheduling-based and sensing-based resources.

The message carrying the information on the sharing of the scheduling-based and the sensing-based resources may be v2x-CommTXPoolNormalCommon included in a message called System Information Block 21 (SIB 21).

In this embodiment, if the UE receives information indicative of sharing of the scheduling-based resources and sensing-based resources from the base station in the state that it has already received information indicative of the non-sharing of the scheduling-based resources and sensing-based resources from the base station as denoted by reference number 2940, the UE senses the sensing-based resources during a sensing period (e.g., 1000+b ms) 3150 to transmit a V2X message.

In this embodiment, the UE transmits the V2X message on separate resources 3160 without waiting until it becomes possible to transmit data on the sensed resources. For example, the information on the separate resources may be carried by a message called commTXPoolExceptional in LTE. The base station may transmit the information on the separate resources to the UE via a broadcast message. Afterward, the UE transmits the V2X message on the sensed resources 3170.

Figure 32:
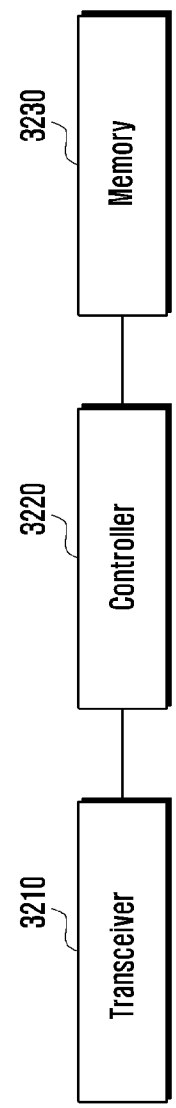
FIG. 32 is a block diagram illustrating a configuration of a UE according to an embodiment of the present invention.

FIG. 32 is a block diagram illustrating a configuration of a UE according to an embodiment of the present invention.

In reference to FIG. 32, the UE may include a transceiver 3210, a controller 3220, and a storage unit 3230. In the present invention, the controller may be defined as a circuit, an application-specific integrated circuit, or at least one processor.

The transceiver 3210 may transmit and receive signals. For example, the transceiver 3210 may transmit remaining power, remaining power level, and UE capability information to a base station and receive resource information.

The controller 3220 may control overall operations of the UE according to an embodiment of the present invention. For example, the controller 3220 may control signal flows among the function blocks to perform the operations described with reference to the accompanying drawings.

The storage unit 3230 may store at least one of information transmitted/received by the transceiver 3210 and information generated by the controller 3230.

Figure 33:
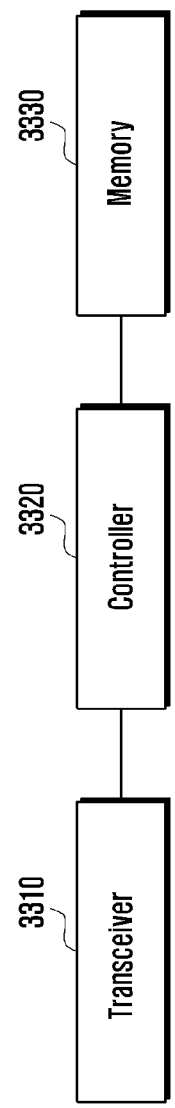
FIG. 33 is a block diagram illustrating a configuration of a base station according to an embodiment of the present invention.

FIG. 33 is a block diagram illustrating a configuration of a base station according to an embodiment of the present invention.

In reference to FIG. 22, the base station may include a transceiver 3310, a controller 3320, and a storage unit 3330. In the present invention, the controller may be defined as a circuit, an application-specific integrated circuit, or at least one processor.

The transceiver 3310 may transmit and receive signals. For example, the transceiver 3210 may receive remaining power, remaining power level, and UE capability information from a UE.

The controller 3320 may control overall operations of the base station. For example, the controller 3320 may control signal flows among the function blocks to perform the operations described with reference to the accompanying drawings.

The storage unit 3330 may store at least one of information transmitted/received by the transceiver 3310 and information generated by the controller 3320.

Although depicted in a particular order in a drawing, two successive steps may be performed in reverse order or in parallel. It is obvious that a step may be performed optionally unless expressly stated as essential.

The drawings illustrating methods of the present invention may include part of components without departing from the technical concept of the present invention.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method of a terminal in a wireless communication system, the method comprising:
   receiving, from a base station, a radio resource control (RRC) message including information on a normal resource pool for transmitting a vehicle to everything (V2X) message;
   receiving, from the base station, information on an exceptional resource pool, wherein the exceptional resource pool is used in case that the normal resource pool is not available;
   selecting a resource from the exceptional resource pool in case that the V2X message is a message of a pedestrian terminal, a partial sensing is used on the normal resource pool, and a sensing result on the normal resource pool is not available; and
   transmitting the V2X message based on the resource selected from the exceptional resource pool.

2. The method of claim 1, further comprising:
   selecting a resource from the normal resource pool in case that the sensing result on the normal resource pool is available; and
   transmitting the V2X message on the resource selected from the normal resource pool.

3. The method of claim 1, wherein the partial sensing is selected as one of partial sensing and random selection based on a configuration for the normal resource pool by the base station.

4. The method of claim 3, wherein the configuration for the normal resource pool by the base station is based on capability information of the terminal associated with channel monitoring capability.

5. The method of claim 1, further comprising transmitting the V2X message on the resource from the exceptional resource pool until the sensing result on the normal resource pool is available.

6. A method of a base station in a wireless communication system, the method comprising:
   transmitting, to a terminal, a radio resource control (RRC) message including information on normal resource pool for transmitting a vehicle to everything (V2X) message; and
   transmitting, to the terminal, information on an exceptional resource pool, wherein the exceptional resource pool is used in case that the normal resource pool is not available,
   wherein a resource from the exceptional resource pool is used for transmitting the V2X message in case that the V2X message is a message of a pedestrian terminal, a partial sensing is used on the normal resource pool, and a sensing result on the normal resource pool is not available.

7. The method of claim 6, wherein a resource from the normal resource pool is used for transmitting the V2X message in case that the sensing result on the normal resource pool is available.

8. The method of claim 6, wherein the partial sensing is selected as one of partial sensing and random selection based on a configuration for the normal resource pool by the base station.

9. The method of claim 8, wherein the configuration for the normal resource pool by the base station is based on capability information of the terminal associated with channel monitoring capability.

10. The method of claim 6, wherein the resource from the exceptional resource pool is used for transmitting the V2X message until the sensing result on the normal resource pool is available.

11. A terminal in a wireless communication system, the terminal comprising:
    a transceiver; and
    a controller configured to:
        receive, from a base station via the transceiver, a radio resource control (RRC) message including information on a normal resource pool for transmitting a vehicle to everything (V2X) message,
        receive, from the base station, information on an exceptional resource pool, wherein the exceptional resource pool is used in case that the normal resource pool is not available,
        select a resource from the exceptional resource pool in case that the V2X message is a message of a pedestrian terminal, a partial sensing is used on the normal resource pool, and a sensing result on the normal resource pool is not available, and
        transmit the V2X message based on the resource selected from the exceptional resource pool.

12. The terminal of claim 11, wherein the controller is configured to:
    select a resource from the normal resource pool in case that the sensing result on the normal resource pool is available, and
    transmit the V2X message on the resource selected from the normal resource pool.

13. The terminal of claim 11, wherein the partial sensing is selected as one of partial sensing and random selection based on a configuration for the normal resource pool by the base station.

14. The terminal of claim 13, wherein the configuration for the normal resource pool by the base station is based on capability information of the terminal associated with channel monitoring capability.

15. The terminal of claim 11, wherein the controller is configured to control to transmit the V2X message on the resource from the exceptional resource pool until the sensing result on the normal resource pool is available.

16. A base station of a wireless communication system, the base station comprising:
    a transceiver; and
    a controller configured to:
        transmit, to a terminal via the transceiver, a radio resource control (RRC) message including information on a normal resource pool for transmitting a vehicle to everything (V2X) message, and
        transmit, to the terminal, information on an exceptional resource pool, wherein the exceptional resource pool is used in case that the normal resource pool is not available,
    wherein a resource from the exceptional resource pool is used for transmitting the V2X message in case that the V2X message is a message of a pedestrian terminal, a partial sensing is used on the normal resource pool, and a sensing result on the normal resource pool is not available.

17. The base station of claim 16, wherein a resource from the normal resource pool is used for transmitting the V2X message in case that the sensing result on the normal resource pool is available.

18. The base station of claim 16, wherein the partial sensing is selected as one of partial sensing and random selection based on a configuration for the normal resource pool by the base station.

19. The base station of claim 18, wherein the configuration for the normal resource pool by the base station is based on capability information of the terminal associated with channel monitoring capability.

20. The base station of claim 16, wherein the resource from the exceptional resource pool is used for transmitting the V2X message until the sensing result on the normal resource pool is available.

* * * * *